(12) United States Patent
Hart et al.

(10) Patent No.: US 8,705,458 B2
(45) Date of Patent: Apr. 22, 2014

(54) WIRELESS COMMUNICATION SYSTEMS

(75) Inventors: Michael John Beems Hart, London (GB); Yuefeng Zhou, Surrey (GB)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/226,319

(22) PCT Filed: Jul. 31, 2007

(86) PCT No.: PCT/GB2007/002911
§ 371 (c)(1),
(2), (4) Date: Mar. 11, 2010

(87) PCT Pub. No.: WO2008/113966
PCT Pub. Date: Sep. 25, 2008

(65) Prior Publication Data
US 2010/0214992 A1    Aug. 26, 2010

(30) Foreign Application Priority Data

Mar. 19, 2007   (GB) .................................. 0705225.1

(51) Int. Cl.
*H04W 4/00* (2009.01)
*H04B 7/212* (2006.01)

(52) U.S. Cl.
USPC ........................... 370/329; 370/347; 370/442

(58) Field of Classification Search
USPC .......................... 370/328, 329, 345, 347, 442
See application file for complete search history.

(56) References Cited

U.S. PATENT DOCUMENTS

| 4,261,054 | A | 4/1981 | Scharla-Nielsen |
| 5,029,164 | A | 7/1991 | Goldstein |
| 5,293,639 | A | 3/1994 | Wilson |
| 5,592,154 | A * | 1/1997 | Lin et al. .................... 455/435.3 |
| 5,724,659 | A | 3/1998 | Daniel |
| 6,002,690 | A | 12/1999 | Takayama |
| 6,678,248 | B1 | 1/2004 | Haddock et al. |
| 6,907,212 | B2 | 6/2005 | Harada et al. |

(Continued)

FOREIGN PATENT DOCUMENTS

| CA | 2556681 A1 | 9/2005 |
| CN | 1547862 A | 11/2004 |

(Continued)

OTHER PUBLICATIONS

Extended European Search Report dated Mar. 1, 2010 received in corresponding European Patent No. 09172393.2-2416/2141870.

(Continued)

*Primary Examiner* — Ronald Abelson
(74) *Attorney, Agent, or Firm* — Smith, Gambrell & Russell, LLP

(57) ABSTRACT

A wireless communication system in which base stations communicate with subscriber stations by exchange of data packets contained within frames. The frames, which occupy a certain time duration as well as frequency range, each include a downlink subframe from a base station to subscriber stations, and an uplink subframe used by the subscribers to send data to the base station. Each subframe includes a plurality of zones, and each base station maintains a plurality of simultaneous connections with the subscribers by transmitting packets within the zones to the relevant subscriber stations. The zones allow frequency reuse when subscribers are located in different cells served by the same base station. In addition, each connection has an associated service level requiring more or less resources within the system.

17 Claims, 8 Drawing Sheets

(56) References Cited

U.S. PATENT DOCUMENTS

| | | |
|---|---|---|
| 7,184,703 B1 | 2/2007 | Naden |
| 7,400,856 B2 | 7/2008 | Sartori |
| 7,454,244 B2 | 11/2008 | Kassab |
| 7,574,230 B1 | 8/2009 | Oh |
| 7,609,631 B2 | 10/2009 | Stanwood |
| 7,738,859 B2 | 6/2010 | Roy |
| 7,865,146 B2 | 1/2011 | Hart |
| 7,881,741 B2 | 2/2011 | Horiuchi |
| 7,983,151 B2 | 7/2011 | Hart |
| 8,000,651 B2 | 8/2011 | Horiuchi |
| 2002/0039383 A1 | 4/2002 | Zhu |
| 2002/0115409 A1 | 8/2002 | Khayrallah |
| 2002/0115440 A1 | 8/2002 | Hamabe |
| 2003/0097460 A1 | 5/2003 | Higashiyama |
| 2003/0123401 A1 | 7/2003 | Dean |
| 2003/0125067 A1 | 7/2003 | Takeda |
| 2003/0156554 A1 | 8/2003 | Dillinger |
| 2003/0165127 A1 | 9/2003 | Fujiwara |
| 2003/0198204 A1* | 10/2003 | Taneja et al. ............ 370/332 |
| 2003/0202476 A1 | 10/2003 | Billhartz |
| 2004/0001464 A1 | 1/2004 | Adkins |
| 2004/0123229 A1 | 6/2004 | Kim |
| 2004/0192204 A1 | 9/2004 | Periyalwar et al. |
| 2004/0213144 A1 | 10/2004 | Murakami et al. |
| 2004/0219876 A1 | 11/2004 | Baker |
| 2004/0233918 A1 | 11/2004 | Larsson et al. |
| 2004/0266339 A1 | 12/2004 | Larsson |
| 2005/0014464 A1 | 1/2005 | Larsson |
| 2005/0048914 A1 | 3/2005 | Sartori |
| 2005/0048983 A1 | 3/2005 | Abraham et al. |
| 2005/0063356 A1 | 3/2005 | Larsen |
| 2005/0201295 A1 | 9/2005 | Kim et al. |
| 2005/0207367 A1 | 9/2005 | Onggosanusi et al. |
| 2005/0213587 A1 | 9/2005 | Cho et al. |
| 2005/0249162 A1 | 11/2005 | Kim |
| 2005/0249164 A1* | 11/2005 | Kwak et al. ............ 370/335 |
| 2005/0272366 A1 | 12/2005 | Eichinger |
| 2005/0288020 A1 | 12/2005 | Cho |
| 2006/0040697 A1 | 2/2006 | Komatsu |
| 2006/0067243 A1 | 3/2006 | Bejerano |
| 2006/0209671 A1 | 9/2006 | Khan |
| 2006/0227796 A1 | 10/2006 | Wei et al. |
| 2006/0230238 A1 | 10/2006 | Roy et al. |
| 2006/0264172 A1 | 11/2006 | Izumikawa |
| 2007/0050495 A1* | 3/2007 | Sridhar et al. ............ 709/223 |
| 2007/0066239 A1 | 3/2007 | Hart |
| 2007/0066240 A1 | 3/2007 | Hart |
| 2007/0066241 A1 | 3/2007 | Hart |
| 2007/0066337 A1 | 3/2007 | Hart |
| 2007/0081507 A1 | 4/2007 | Koo |
| 2007/0116106 A1 | 5/2007 | Hart |
| 2008/0009243 A1 | 1/2008 | Hart |
| 2008/0049718 A1 | 2/2008 | Chindapol |
| 2008/0165720 A1 | 7/2008 | Hu |
| 2008/0225774 A1* | 9/2008 | Kim et al. ............ 370/315 |
| 2009/0185479 A1 | 7/2009 | Hart |
| 2010/0110973 A1 | 5/2010 | Hart |
| 2010/0111027 A1 | 5/2010 | Hart |

FOREIGN PATENT DOCUMENTS

| | | |
|---|---|---|
| CN | 1859364 | 11/2006 |
| EP | 1388936 | 2/2004 |
| EP | 1753188 | 2/2007 |
| EP | 1761080 | 3/2007 |
| EP | 1773091 A2 | 4/2007 |
| EP | 1801995 A1 | 6/2007 |
| GB | 2440982 A | 2/2008 |
| GB | 2440984 A | 2/2008 |
| GB | 2440985 A | 2/2008 |
| GB | 2443466 A | 5/2008 |
| GB | 2443465 A | 7/2008 |
| JP | 3166831 A | 7/1991 |
| JP | 6505371 | 8/1992 |
| JP | 7264651 A | 10/1995 |
| JP | 2002185382 A | 6/2002 |
| JP | 2003124876 A | 4/2003 |
| JP | 2003258719 A | 9/2003 |
| JP | 2004032393 A | 1/2004 |
| JP | 2004173123 A | 6/2004 |
| JP | 2005033625 A | 2/2005 |
| JP | 2005142676 A | 6/2005 |
| JP | 2005142968 A | 6/2005 |
| JP | 2005159900 A | 6/2005 |
| KR | 1020030049031 A1 | 6/2003 |
| WO | 9214309 A1 | 8/1992 |
| WO | 9746038 A2 | 12/1997 |
| WO | 9836509 A1 | 8/1998 |
| WO | 0077948 A1 | 12/2000 |
| WO | 0150635 A1 | 7/2001 |
| WO | 0163849 A2 | 8/2001 |
| WO | 03044970 A2 | 5/2003 |
| WO | 200475468 A2 | 9/2004 |
| WO | 2004107693 A1 | 12/2004 |
| WO | 2004112282 A1 | 12/2004 |
| WO | 2005013507 A1 | 2/2005 |
| WO | 2005020517 A1 | 3/2005 |
| WO | 2005025110 A3 | 3/2005 |
| WO | 2005053338 A1 | 6/2005 |
| WO | 2005064872 A1 | 7/2005 |
| WO | 2005088914 A1 | 9/2005 |
| WO | 2005125109 A2 | 12/2005 |
| WO | 2006020032 A1 | 2/2006 |
| WO | 2006080507 A1 | 8/2006 |
| WO | 2006099024 A2 | 9/2006 |
| WO | 2006101013 A1 | 9/2006 |
| WO | 2006130964 | 12/2006 |
| WO | 2007003142 | 1/2007 |
| WO | 2007019672 A1 | 2/2007 |
| WO | WO 2007/028252 | * 3/2007 |

OTHER PUBLICATIONS

United Kingdom Search Reported dated Apr. 19, 2007 for application No. GB0705225.1.

United Kingdom Search Reported dated May 23, 2007 for application No. GB0705225.1.

Final Office Action dated Aug. 2, 2010 received in U.S. Appl. No. 11/453,045.

Non-Final Office Action dated Jan. 6, 2011 received in U.S. Appl. No. 11/453,045.

Final Office Action dated Jun. 23, 2011 received in U.S. Appl. No. 11/453,045.

Non-Final Office Action dated Dec. 1, 2009 received in U.S. Appl. No. 11/453,045.

Non-Final Office Action dated Jun. 16, 2011 received in U.S. Appl. No. 11/454,028.

European Search Report: EP 0525 3767 dated Oct. 17, 2005.

European Search Report dated Oct. 18, 2005 received in EP05253783.

Non-Final Office Action dated Jun. 22, 2011 received in U.S. Appl. No. 11/637,025.

Japanese Office Action date May 10, 2011 received in JP2006-167984.

Notice of Allowance dated Jul. 28, 2011 received in U.S. Appl. No. 11/453,839.

Japanese Office Action dated May 24, 2011 received in JP2006342666.

Japanese Office Action dated May 31, 2011 received in JP2006167981.

Japanese Office Action dated May 10, 2011 received in JP2006-167982.

Japanese Office Action dated Jun. 14, 2011 received in JP2009-535780.

Japanese Office Action dated Jun. 28, 2011 received in JP2009-091469.

Chinese Office Action dated Aug. 12, 2011 received in 200780033647.2.

Notice of Allowance dated Apr. 26, 2011 received in U.S. Appl. No. 11/453,839.

(56) References Cited

OTHER PUBLICATIONS

Final Office Action dated May 2, 2011 received in U.S. Appl. No. 11/454,016.
Final Office Action dated May 17, 2011 received in U.S. Appl. No. 11/453,055.
Non-Final Office Action dated May 20, 2011 received in U.S. Appl. No. 12/973,086.
Christian Hoymann et al. "Multihop Communication in Relay Enhanced IEEE 802.16 Networks" Personal, Indoor and Mobile Radio Communications, 2006 IEEE 17th International Symposium on, IEEE, PI Sep. 11, 2006, pp. 1-4, XP002462917 the whole document.
Daehyon Kim, et al. "Fair and efficient multihop scheduling algorithm for IEEE 802.16 BWA systems" Broadband Networks, 2005 2nd International Conference onMA Oct. 3-7, 2005, Piscataway, NJ, USA, IEEE pp. 895-901 the whole document.
IEEE Std. 802.16-2004 IEEE Standard for Local and metropolitan area networks Part 16: Air Interface for Fixed Broadband Wireless Access Systems IEEE Computer Society and the IEEE Microwave Theory and Techniques Society, Oct. 1, 2004.
IEEE St. 802.16e 2005 "IEEE Standard for Local and Metropolitan Area Networks. Part 16: Air Interface for Fixed and Mobile Broadband Wireless Access Systems. Amendment 2: Physical and Medium Access Control Layers for Combined Fixed and Mobile Operation in Licensed Bands." Dated Feb. 28, 2006.
International Search Report issued in PCT/GB2007/002909 dated Mar. 2, 2007.
Kaneko S. et al, "Proposed Relay Method with P-MP Structure of IEEE 802.16-2004" Personal, Indoor and Mobile Radio Communications, 2005. PIMRC 2005, IEEE 16th International Symposium on Berlin, Germany Sep. 11-14, 2005, Piscataway, NJ, USA, IEEE, pp. 1606-1610, XP010926479 Paragraph [0011] —paragraph [00IV].
Non-Final Office Action dated Mar. 21, 2011 received in U.S. Appl. No. 12/226,344.
Search Report Issued in United Kingdom application No. 0704093.4 dated Jul. 3, 2007.
Office Action dated Jul. 5, 2011 received in corresponding Japanese Patent Application No. 2009-091471.
Apostolopoulos, J.G. et. al. "Source-Channel Diversity for Parallel Channels" IEEE Transactions on Information Theory, IEEE Service Center, Piscataway, NJ, US, vol. 51, No. 10, Oct. 2005, pp. 3518-3539, XP011139661.
British Search Report for Application No. GB0622120.4 dated Dec. 6, 2006.
Communication dated Sep. 30, 2008 forwarding Extended European Search Report in European Application No. 08151572.8-1246 with abstract and narrative.
European Search Report; EP 0525 3768 dated Oct. 14, 2005.
First Notification of Office Action dated Apr. 3, 2009 received in corresponding Chinese Application No. 200610172053.7.
Advisory Action dated Apr. 29, 2010 received in U.S. Appl. No. 11/454,028.
European Search Report; EP 05253785 dated Oct. 19, 2005.
European Search Report; EP 05253766 dated Oct. 13, 2005.
Final Office Action dated Dec. 28, 2010 received in U.S. Appl. No. 11/454,028.
European Office Action issued Jan. 17, 2011 in application 07 766 391.2-2415.
Mona Ghassemian, Vasilis Friderikos, Hamid Aghvami; Hybrid Handover in Multihop Radio Access Networks; Sep. 2005; document number: XP-010855829.
IEEE Std. 802.11g-2003 IEEE Standard for Information technology—Telecommunications and information exchange between systems—Local and metropolitan area networks—Specific requirements Part 11: Wireless LAN Medium Accedd Control (MAC) and Physical Layer (PHY) specifications Amendment 4: Further Higher Data Rate Extension in the 2.4 Ghz Band IEEE Computer Society, Jun. 27, 2003.
Non-Final Office Action dated Apr. 10, 2009 received in U.S. Appl. No. 11/454,028.
Zhang Jingmei et al.: "Adaptive optimal transmit power allocation for two-hop non-regenerative wireless relaying system", Vehicular Technology Conference, 2004. VTC 2004-spring. 2004 IEEE 59th Milan, Italy May 17-19, 2004, Piscataway, NJ, USA, IEEE, US, vol. 2, May 17, 2004, pp. 1213-1217.
IEEE 802.11 a/g standard: "Wireless LAN Medium Access Control (MAC) and Physical Layer (PHY) specifications" dated Jun. 27, 2003.
International Search Report for PCT/GB2007/002902 dated Dec. 14, 2007.
International Search Report dated Oct. 25, 2007 received in PCT/GB2007/002891.
Non-Final Office Action dated Jan. 5, 2010 received in U.S. Appl. No. 11/637,025.
Final Office Action dated Jul. 6, 2010 recevied in U.S. Appl. No. 11/637,025.
Non-Final Office Action dated Aug. 23, 2010 rec'd in U.S. Appl. No. 12/613,342.
Non-Final Office Action dated Jun. 16, 2010 received in U.S. Appl. No. 12/613,367.
Non-Final Office Action dated Nov. 29, 2010 received in U.S. Appl. No. 11/453,055.
Final Office Action dated Mar. 24, 2010 received in U.S. Appl. No. 11/453,055.
Non-Final Office Action dated Jul. 16, 2009 received in U.S. Appl. No. 11/453,055.
Final Office Action dated Jun. 16, 2010 received in U.S. Appl. No. 11/453,844.
Non-Final Office Action dated Sep. 30, 2009 received in U.S. Appl. No. 11/453,844.
Notice of Allowance dated Oct. 22, 2010 received on U.S. Appl. No. 11/453,844.
Extended European Search Report dated Feb. 8, 2011 received in 09173072.1-1246/2144466.
Extended European Search Report dated Feb. 14, 2011 received in 09173073.9-1246/2144472.
Extended European Search Report dated Feb. 14, 2011 received in 09173074.7-1246/2144473.
Advisory Action dated Jul. 2, 2010 received in U.S. Appl. No. 11/453,055.
Extended European Search Report dated Feb. 2, 2011 received in 06252979.7-1246/1734669.
Final Office Action dated Mar. 9, 2011 received in U.S. Appl. No. 12/613,342.
Final Office Action dated Dec. 15, 2009 received in U.S. Appl. No. 11/454,016.
Final Office Action dated Jan. 25, 2011 received in U.S. Appl. No. 12/613,367.
Non-Final Office Action dated Dec. 9, 2010 received in U.S. Appl. No. 11/454,016.
Non-Final Office Action dated Apr. 9, 2009 received in U.S. Appl. No. 11/454,016.
Notice of Allowance dated Jan. 13, 2011 received in U.S. Appl. No. 11/453,839.
Non-Final Office Action dated Jun. 8, 2010 received in U.S. Appl. No. 11/453,839.
Notice of Allowance dated May 23, 2011 received in U.S. Appl. No. 11/453,839.
Final Office Action dated Dec. 15, 2009 received in U.S. Appl. No. 11/454,028.
Non-Final Office Action dated Jun. 30, 2010 received in U.S. Appl. No. 11/454,028.
European Search Report EP05253784 dated Oct. 17, 2005.
First Notification of Office Action in corresponding 200610095607.8 dated Feb. 6, 2009.
Sreng V. et al.: Relayer selection strategies in cellular networks with peer-to-peer relaying, Vehicular Technology Conference, 2003. 2003 IEEE 58th Orlando, Fl., USA Oct. 6-9, 2003, Piscataway, NJ, USA, IEEE, US, Oct. 6, 2003, pp. 1949-1953.
Non-Final Office Action dated Aug. 2, 2012 received in U.S. Appl. No. 11/453,055.
Final Office Action dated Aug. 14, 2012 received in U.S. Appl. No. 12/613,342.

(56) References Cited

OTHER PUBLICATIONS

Final Office Action dated Aug. 23, 2012 received in U.S. Appl. No. 12/613,367.
Final Office Action dated Jun. 26, 2012 received in U.S. Appl. No. 12/226,344.
Japanese Office Action dated Mar. 21, 2012 received in JP2009-530924.
Notification of Reasons for Refusal dated Apr. 24, 2012 received in JP2006-167986.
Final Notification for Reasons for Refusal dated Feb. 14, 2012 received in JP2009-535780.
Modification for Enabling RS Operations dated Nov. 2005 by Tzu-Ming Lin, Chang-Lung Hsiao, Rodger Tseng and Wem-Ho Sheen ITRI Computer and Communications Research Labs, Tawain, R.O.C.
Notice of Allowance received in U.S. Appl. No. 11,454,028 dated May 24, 2012.
Japanese Office Action dated May 29, 2012 received in Japanese Patent Application No. JP2011-081524.
Notice of Allowance dated Mar. 8, 2012 received in U.S. Appl. No. 12/301,414.
Non-Final Office Action dated Jan. 9, 2013 received in U.S. Appl. No. 12/613,367.
Non-Final Office Action dated Jan. 9, 2013 received U.S. Appl. No. 11/454,016.
Non-Final Office Action dated Dec. 10, 2012 received in U.S. Appl. No. 12/226,344.
Non-Final Office Action dated Jan. 10, 2013 received in U.S. Appl. No. 12/613,342.
Final Office Action dated Dec. 14, 2012 received in U.S. Appl. No. 11/453,055.
Notification of Reason(s) for Refusal dated Dec. 18, 2012 received in Japanese Patent Application No. 2011-191107.
Non-final Office Action dated Jun. 17, 2013 received in U.S. Appl. No. 12/513,805.
Final Office Action dated Jun. 26, 2013 received in U.S. Appl. No. 12/226,344.
Notice of Allowance dated Jun. 21, 2013 received in U.S. Appl. No. 11/454,028.
Final Office Action dated Jul. 9, 2013 received in U.S. Appl. No. 13/168,500.
Japanese Office Action dated Mar. 12, 2013 received in Patent Appeal No. 2012-516.
3rd Notification of Chinese Office Action dated Jul. 15, 2013 received in Application No. 200910167069.2.
Final Office Action dated Oct. 1, 2013 received in U.S. Appl. No. 11/454,016.
Notice of Allowance dated Oct. 16, 2013 received in U.S. Appl. No. 12/226,344.
Non-final Office Action dated Jul. 19, 2013 received in U.S. Appl. No. 11/453,055.
Notice of Allowance dated Aug. 5, 2013 received in U.S. Appl. No. 12/613,342.
Notice of Allowance dated Aug. 16, 2013 received in U.S. Appl. No. 12/613,367.
Japanese Office Action dated Feb. 1, 2011 received in corresponding Japanese Patent Application 2006167985.
Japanese Office Action dated May 10, 2011 received in corresponding Japanese Patent Application 2006167983.
Final Office Action dated Sep. 29, 2011 received in U.S. Appl. No. 11/454,016.
Final Office Action dated Oct. 25, 2011 received in U.S. Appl. No. 12/226,344.
Non-Final Office Action dated Oct. 31, 2011 received in U.S. Appl. No. 12/301,414.
Notice of Allowance dated Nov. 7, 2011 received in U.S. Appl. No. 11/453,839.
Notification of Reason for Refusal dated Sep. 6, 2011 received in corresponding Japanese Patent Application 2006167986.
Notice of Allowance dated Nov. 23, 2011 received in U.S. Appl. No. 12/973,086.
Notice of Allowance dated Sep. 28, 2011 received in U.S. Appl. No. 12/973,086.
Advisory Action dated Apr. 23, 2010 received in U.S. Appl. No. 11/454,016.
Notice of Allowance dated Jan. 19, 2012 received in U.S. Appl. No. 11/454,028.
Decision of Refusal dated Oct. 11, 2011 received in Japanese Patent Application No. 2006-167984.
Decision of Refusal dated Oct. 11, 2011 received in Japanese Patent Application No. 2006-167982.
Japanese Office Action dated Dec. 13, 2011 received in JP2009-529749.
Non-Final Office Action dated Jan. 12, 2012 received in U.S. Appl. No. 12/613,367.
Notice of Allowance dated Dec. 22, 2011 received in U.S. Appl. No. 11/453,839.
Non-Final Office Action dated Feb. 7, 2012 received in U.S. Appl. No. 12/613,342.
Non-Final Office Action dated Feb. 13, 2012 received in U.S. Appl. No. 12/226,344.
Non-final Office Action dated Oct. 31, 2013 received in U.S. Appl. No. 13/168,500.
Final Office Action dated Jan. 29, 2014 received in U.S. Appl. No. 12/513,805.

* cited by examiner

WIRELESS COMMUNICATION SYSTEMS

TECHNICAL FIELD

The present invention relates to wireless communication systems of the type in which a base station (BS) communicates with multiple fixed or mobile subscriber stations (SS).

BACKGROUND ART

Recently, various standards have been developed for data communication over broadband wireless links. One such standard is set out in the IEEE 802.16 specifications and is commonly known as WiMAX. The specifications include IEEE 802.16-2004, primarily intended for systems having fixed subscriber stations, and IEEE 802.16e-2005 which among other things provides for mobile subscriber stations. In the following description, the term subscriber station (SS) applies to both fixed and mobile stations (SS/MS).

The entire content of IEEE Std 802.16-2004 "Air Interface for Fixed Broadband Wireless Access Systems" is hereby incorporated by reference. IEEE 802.16 envisages single-hop systems in which the subscriber station communicate directly with a base station within range, the range of a base station defining at least one "cell". By deploying base stations at suitable positions within a given geographical area, and/or by providing multiple antennas in the same base station, a contiguous group of cells can be created to form a wide-area network. In this specification, the terms "network" and "system" will be used equivalently.

In systems of the above type, data is communicated by exchange of packets between the subscriber stations and base station whilst a connection (management connection or transport connection) is maintained between them. The direction of transmission of packets from the subscriber station to the base station is the uplink (UL), and the direction from the base station to the subscriber station is the downlink (DL). The packets have a defined format which follows a layered protocol applied to the system and its component radio devices. Protocol layers relevant to packets as such are the so-called physical layer (PHY) and media access layer (MAC). In the IEEE 802.16-2004 specification, these protocol layers form a protocol stack as shown in FIG. 1.

The media access layer shown in FIG. 1 is the protocol layer of most concern in the invention to be described. It is responsible for handling various functions including network access, bandwidth allocation, and maintaining connections. This includes controlling access of the BS and SS's to the network on the basis of "frames" which are the predetermined unit of time in the system, and which are divided in the time domain into a number of slots. Data is exchanged between the MAC peer entities, in other words, between the subscriber station and base station, in units of a protocol data unit (PDU), the PDU being conveyed across the PHY layer using a number of slots. Thus, a "slot" is a unit of time used for allocating bandwidth. The MAC is divided into sublayers including a security sublayer (see FIG. 1) for allowing authentication, key exchange and encryption of PDUs. These functions and sublayers can be roughly grouped into an "upper MAC" or UMAC, comprising the higher-level functions and a lower MAC or LMAC having the lower-level, more time-critical functions.

The UMAC is usually implemented by running software on a general purpose microprocessor, allowing re-programming when required for updates and system changes. Its functions include MAC management, the Service-Specific Conveyence Sublayer as shown in FIG. 1, and the MAC Common Part Sublayer (MAC CPS, see FIG. 1). The LMAC may also be provided by software executed by a processor but in this case, lower-level code (possibly embedded in the processor) and/or a real-time operating system are required. The LMAC acts as a bridge between the UMAC and the PHY, off-loading some of the task of UMAC by performing data encryption/decryption (functions of the Security Sublayer shown in FIG. 1), generation of error correction codes (CRC), PDU classification and FEC block processing as mentioned further below.

When considering transmission of data, data flow is generally from upper to lower levels in the protocol stack. Thus, for example, data packets (or so-called service data units, SDUs, described in more detail below) are transferred from a higher level in the protocol stack (an Application Layer, not shown in FIG. 1) via the CS SAP shown in FIG. 1. In the UMAC, the SDUs are organised into queues for transfer to the LMAC, where they are converted (in a process called "packing") into MAC PDUs for constructing a subframe. Since the data sizes of SDUs and PDUs need not match, so-called "fragmentation" may also be required, in which a single SDU is split between multiple MAC PDUs. In the physical layer, the assembled subframe is prepared for transmission by assigning its constituent elements to one of a number of "bursts" of radio waves. FIG. 2 shows schematically the relationship between SDUs, PDUs and bursts.

In the bursts, Forward Error Correction (FEC) is used to help the receiver correct errors introduced by the transmission process. Each burst can include a plurality of FEC blocks as indicated in FIG. 2. The MAC PDUs are contained (in concatenated form) in the FEC blocks, and a MAC PDU may span FEC block boundaries.

Various physical layer implementations are possible in an IEEE 802.16 network, depending on the available frequency range and application; for example, a time division duplex (TDD) mode and a frequency division duplex (FDD) mode as described below. The PHY layer also defines the transmission technique such as OFDM (orthogonal frequency division multiplexing) or OFDMA (orthogonal frequency division multiple access), which techniques will now be outlined briefly.

In OFDM, a single data stream is modulated onto N parallel sub-carriers, each sub-carrier signal having its own frequency range. This allows the total bandwidth (i.e. the amount of data to be sent in a given time interval) to be divided over a plurality of sub-carriers thereby increasing the duration of each data symbol. Since each sub-carrier has a lower information rate, multi-carrier systems benefit from enhanced immunity to channel induced distortion compared with single carrier systems. This is made possible by ensuring that the transmission rate and hence bandwidth of each sub-carrier is less than the coherence bandwidth of the channel. As a result, the channel distortion experienced on a signal sub-carrier is frequency independent and can hence be corrected by a simple phase and amplitude correction factor. Thus the channel distortion correction entity within a multicarrier receiver can be of significantly lower complexity of its counterpart within a single carrier receiver when the system bandwidth is in excess of the coherence bandwidth of the channel.

An OFDM system uses a plurality of sub-carrier frequencies which are orthogonal in a mathematical sense so that the sub-carriers' spectra may overlap without interference due to the fact they are mutually independent. The orthogonality of OFDM systems removes the need for guard band frequencies and thereby increases the spectral efficiency of the system. OFDM has been proposed and adopted for many wireless systems. In an OFDM system, a block of N modulated parallel data source signals is mapped to N orthogonal parallel sub-carriers by using an Inverse Discrete or Fast Fourier Transform algorithm (IDFT/IFFT) to form a signal known as an "OFDM symbol" in the time domain at the transmitter. Thus, an "OFDM symbol" is the composite signal of all N sub-carrier signals. At the receiver, the received time-domain signal is transformed back to frequency domain by applying Discrete Fourier Transform (DFT) or Fast Fourier Transform (FFT) algorithm.

OFDMA (Orthogonal Frequency Division Multiple Access) is a multiple access variant of OFDM. It works by assigning a subset of the sub-carriers to an individual subscriber. This allows simultaneous transmission from several users leading to better spectral efficiency. However, there is still the issue of allowing bi-directional communication, that is, in the uplink and download directions, without interference.

In order to enable bi-directional communication between two nodes, two well known different approaches exist for duplexing the two (forward or downlink and reverse or uplink) communication links to overcome the physical limitation that a device cannot simultaneously transmit and receive on the same resource medium. The first, frequency division duplexing (FDD), involves operating the two links simultaneously but on different frequency bands by subdividing the transmission medium into two distinct bands, one for DL and the other for UL communications. The second, time division duplexing (TDD), involves operating the two links on the same frequency band, but subdividing the access to the medium in time so that only the DL or the UL will be utilizing the medium at any one point in time. Both approaches (TDD & FDD) have their relative merits and are both well used techniques for single hop wired and wireless communication systems. Although the IEEE802.16 standard incorporates both an FDD and TDD mode, the remainder of this description will refer to the TDD mode.

FIGS. 3 and 4 illustrate the TDD frame structure used in the OFDMA physical layer mode of the IEEE802.16 standard (WiMAX).

Referring first to FIG. 3, the frame can be considered to occupy a given length of time and a given frequency band, the time axis being denoted in FIG. 3 by "OFDMA symbol number", and the frequency axis by "subchannel logical number" (each subchannel is a set of the sub-carriers referred to above). Each frame is divided into DL and UL subframes, each being a discrete transmission interval. They are separated by a Transmit/Receive and Receive/Transmit Transition Guard interval (TTG and RTG respectively). Each DL subframe starts with a preamble followed by the Frame Control Header (FCH), the DL-MAP, and the UL-MAP. The FCH contains the DL Frame Prefix (DLFP) to specify the burst profile and the length of the DL-MAP. The DLFP is a data structure transmitted at the beginning of each frame and contains information regarding the current frame; it is mapped to the FCH. Simultaneous DL allocations can be broadcast, multicast and unicast and they can also include an allocation for another BS rather than a serving BS. Simultaneous ULs can be data allocations and ranging or bandwidth requests.

FIG. 4 shows the OFDMA TDD frame structure from a different perspective, illustrating, within the UL-subframe, a packet format having two parts, a PHY header and a MAC PDU. The MAC PDU in turn consists of a MAC header, an optional payload, and optional error correction code (cyclic redundancy code or CRC). The PHY header includes training sequences, frequency band allocation information, and other information relating to physical layer parameters. Within the MAC PDU, the MAC header normally gives essential parameters for media access, such as the type of PDU, MAC address, and type of MAC signalling etc. The CRC within MAC PDU is optional, and can be used to check the received MAC PDU. The payload within MAC PDU is used to contain the data which the SS wishes to send to the BS, but is also optional. For example, some controlling messages, such as a bandwidth request, or an ACK message, have no payload. The payload could be data from higher layer, or sub-MAC-header, which can give additional MAC information.

Additionally, 802.16e OFDMA provides subchannelization as a means to better manage network performance to address specific coverage and capacity requirements. The OFDMA physical layer divides the available OFDM symbols and component sub-carriers (see FIG. 3) into distinct logical and physical subchannels, allowing multiple bursts to co-exist or overlap in the same time interval as shown in FIG. 3. On the downlink, a single burst may be shared by several users (subscriber stations) but on the uplink, each burst corresponds to a single user. OFDMA subchannelization techniques include Frequency Diverse and Frequency Selective Transmission schemes.

Frequency Diverse Transmission schemes can be grouped into Full Usage of Subchannels (FUSC) and Partial Usage of Subchannels (PUSC) modes. These modes support frequency diverse transmission, where the subcarriers assigned to each logical subchannel are pseudo-randomly distributed across the available subcarrier set. In FUSC, the subcarriers are scattered throughout the frequency range whereas in PUSC, several scattered clusters of subcarriers are used to form a subchannel. These schemes provide frequency diversity that is better suited to handle varying channel conditions and benefits network coverage and capacity.

Frequency Selective subchannelization is supported through the Band Adaptive Modulation and Coding (AMC) mode. Band AMC permits subchannel construction through physically adjacent subcarrier allocations, that is, contiguous groups of subcarriers. The system scheduler can utilize closed loop channel feedback techniques to determine the optimal subchannels to be allocated to each subscriber based on the unique channel conditions. FIG. 6 shows an OFDMA TDD mode frame structure including FUSC, PUSC and AMC zones. In general, FUSC and PUSC are more suitable for connections between a base station and mobile stations, with AMC being suitable for connections with fixed subscriber stations.

Subchannelization is of significance for frequency reuse schemes for allocation of frequencies among adjacent cells. Perhaps the most common reuse scheme is referred to as "reuse 3" (re-use factor 3): in this scheme, hexagonal cells are considered with each pair of adjacent cells being allotted a different set of frequency channels to reduce interference, three sets of channels being sufficient to achieve this. PUSC or FUSC is an appropriate transmission scheme in this case, since due to the random allocation of subcarriers to subchannels the possibility of interference between signals in different cells is further minimized. "Reuse 1", on the other hand, simply means using the same set of frequencies in every cell (re-use factor 1). This tends to increase interference (reduce CINR) but allows the whole of the available frequency range (all subchannels in FIG. 3) to be used by each connection, and is simpler to implement in real-world systems. It is possible to employ different re-use schemes simultaneously for different subscribers in a single cell. In particular, Reuse 3 may be appropriate for users near the edges of a cell whilst Reuse 1 can be safely used for subscribers near the centre of a cell where interference from other cells is unlikely. This results in an "effective reuse factor" for the system of somewhere between 1 and 3. Conventionally, cells were each provided with a respective, centrally-located base station but increasingly, multiple directional antennas are mounted on a single base station to allow the same base station to serve a plurality of cells around itself.

The DL-subframe includes a broadcast control field with a DL-MAP and UL-MAP, by which the BS informs the receiving device of the frame structure. The MAP is a map of bandwidth allocation in the frame and consists of Information Elements (IEs) each containing a connection ID. The map IEs inform subscriber stations to which burst(s) they have been assigned to receive information. Thus, in a TDD mode network, bandwidth allocation means the allocation of resources (slots) within frames. The DL-MAP and UL-MAP are examples of management messages broadcast by the BS (that is, transmitted to all subscribers). Other management messages include an Uplink Channel Descriptor UCD and Downlink Channel Descriptor DCD (both shown in FIG. 4), and Dynamic Service Request and Response (DS-REQ and -RSP) messages.

The concept of quality of service (QoS) is employed in wireless communication systems for allowing a wide range of services to be provided. Depending upon the kind of service being provided (see below), packets may need to be transmitted with a certain accuracy and/or within a certain time delay or they may be useless, and possibly require re-transmission. Thus, during communication with a subscriber station, the base station allocates a QoS level depending on the type of service requested by the subscriber station and available bandwidth, bearing in mind that the base station typically will be communicating with several subscriber stations simultaneously. The QoS parameters take into account priority of transmission (time delay or latency), accuracy of transmission (error rate) and throughput (data rate).

A connection between a base station and subscriber station (more precisely, between MAC layers in those devices—so-called peer entities) is assigned a connection ID (CID) and the base station keeps track of CIDs for managing its active connections. To support addressing and QoS control, some wireless communication systems put connection identification (CID) into a MAC header. For instance, in WiMAX, the service flow between SS/MS and BS can be created and activated during network entry procedure or by dynamic service flow procedure. As mentioned earlier, a service flow ID (SFID) will be assigned to each existing service flow, and each service flow is also associated with a specific QoS demand. A service flow has at least an SFID and an associated direction. The connection ID (CID) of the transport connection exists only when the service flow is admitted or active. The relationship between SFID and transport CID is unique, which means an SFID shall never be associated with more than one transport ID, and a transport CID shall never be associated with more than one SFID.

The BS uses a scheduler (scheduling algorithm) to manage the bandwidth (slot) allocations for all the currently-active connections, balancing the needs of the various subscribers. That is, each SS has to negotiate only once for network entry, after which it is allocated bandwidth by the BS which, though it may increase or decrease on request from the SS or under other demands on the network, remains assigned to that SS thus keeping the connection active.

The scheduler has to ensure, as far as possible, that all connections needing to be served within the current frame (in particular, the DL subframe being constructed in the base station) receive some resources (bandwidth). Aside from this QoS requirement, other factors to be taken into account include the distance (path loss) from the base station to each subscriber and the mobility, if any, of the subscriber. If a subscriber is far from the base station, or moving away, the feasible transmission rate on the downlink will be reduced so that it may be more efficient (in terms of system throughput) to give preference to subscribers closer to the base station. On the other hand, it is not acceptable for any subscribers to be starved of data.

One technique aiming to balance these factors is called the "proportional fair" algorithm. It seeks to achieve a balance between system throughput and fairness to subscribers by maximising the logarithms of long-term averaged data rates provided to all subscribers.

As already mentioned, each connection has a service class and an associated QoS. The QoS is allocated first during a network entry procedure (connection set-up phase) at the time the subscriber station joins the network, and may be modified subsequently by the subscriber station making a request to the base station whilst the connection is maintained. This may involve assigning additional bandwidth to the connection, perhaps repeatedly, depending on available resources in the network.

The relationship between QoS and CID/SFID is illustrated in FIG. 5. For ease of understanding FIG. 5, it is noted that "service flow" refers to transmission of data in a given direction (uplink or downlink) on a connection having a particular QoS. The QoS of the connection is defined by a service flow identifier (SFID) which has a one-to-one relationship to the connection ID. Strictly speaking, it is the service flow (or the connection) to which bandwidth is allocated, but it is convenient to think of bandwidth being assigned by the BS to the SS involved in the connection. Each service flow can be classified into one of a set of service classes or QoS classes. Although basically the same for both the DL and UL, these service classes are defined slightly differently from the point of view of the DL and UL scheduler. There are differences between the mechanism for QoS delivery on the DL and UL due to the fact the BS does not have direct visibility of the buffer status at the MS and may not know the packet error rate at the MS.

Downlink (DL)

The following service class types are defined in the IEEE 802.16:

UGS: Unsolicited grant service
RT-VR: Real-time variable rate service
ERT-VR: Extended real-time variable rate service
NRT-VR: Non real-time variable rate service
BE: Best effort service Table 1 provides a brief description of the purpose and lists the parameters associated with each service class. These parameters are described in Table 2.

TABLE 1

Overview of DL service types.

| Type | Purpose | Associated parameters |
|---|---|---|
| UGS | Support real-time applications generating fixed-rate data that require guaranteed delay and jitter. PDU lengths can be fixed or variable. | Tolerated jitter<br>Maximum sustained traffic rate<br>Minimum reserved traffic rate<br>Maximum latency<br>Request/Transmission policy<br>Unsolicited grant interval |
| RT-VR | Support real-time data applications generating variable-rate data that require guaranteed rate and delay. | Maximum latency<br>Minimum reserved traffic rate<br>Maximum sustained traffic rate<br>Traffic priority<br>Request/transmission policy<br>(Unsolicited polling interval) |
| ERT-VR | Support real-time data applications generating variable-rate data that required guaranteed rate, delay and jitter. | Maximum latency<br>Tolerated jitter<br>Minimum reserved traffic rate<br>Maximum sustained traffic rate<br>Traffic priority<br>Request/transmission policy<br>Unsolicited grant interval |
| NRT-VR | Support non-real-time applications generating variable-rate data that require guaranteed rate but insensitive to delay. | Minimum reserved traffic rate<br>Maximum sustained traffic rate<br>Traffic priority<br>Request/transmission policy |
| BE | Support applications generating variable-rate data with no rate or delay requirements. | Maximum sustained traffic rate<br>Traffic priority<br>Request/transmission policy |

TABLE 2

Parameter description.

| Parameter | Definition |
|---|---|
| Minimum reserved traffic rate | Minimum rate measured at input of the CS. |
| Maximum latency | Maximum time to deliver packet between CS and CS at peer. |
| Maximum sustained traffic rate | Bound on maximum SDU data rate. Definition is left to vendor implementation. SDUs deemed to exceed may be delay or dropped. |
| Request/transmission policy | PDU formation attributes (fragment/pack/CRC/header suppression) |
| Tolerated jitter | Maximum delay variation. |
| Traffic priority | When two service flows are identical in all parameters, traffic priority dictates which flow should take precedence. |
| Unsolicited polling interval | Interval between successive polling grant opportunities. Polling shall be performed with no jitter allowance. |
| Unsolicited grant interval | Interval between successive data grant opportunities. Grant shall be made between interval time and interval time + tolerated jitter. |

It is the role of the downlink packet scheduler to ensure that the requirements set for each active service flow, based on the configured parameter settings, are met.

Uplink (UL)

The following service class types and scheduling services are defined in the IEEE 802.16 standard and supported in the WiMAX Forum Mobile System Profile:

UGS: Unsolicited grant service
rtPS: Real-time polling service
ertPS: Extended real-time polling service
nrtPS: Non-real-time polling service
BE: Best effort service).

Table 3 provides a brief description of the purpose and lists the parameters associated with each service class (note the description of the parameters is provided in Table 2).

TABLE 3

Overview of UL service types.

| Type | Purpose | Associated parameters |
|---|---|---|
| UGS | Support real-time applications generating fixed-rate data that requires guaranteed delay and jitter. Provides grants in unsolicited manner. | Maximum sustained traffic rate<br>Tolerated jitter<br>Minimum reserved traffic rate (same as max. sustained rate)<br>Maximum latency<br>Request/Transmission policy<br>Unsolicited grant interval |
| rtPS | Support real-time data applications generating variable-rate data that require guaranteed rate and delay. Provides periodic request opportunities. | Maximum latency<br>Minimum reserved traffic rate<br>Maximum sustained traffic rate<br>Traffic priority<br>Request/transmission policy<br>Unsolicited polling interval |
| ertPS | Support real-time data applications generating variable-rate data that required guaranteed rate, delay and jitter. Provides grants in unsolicited manner. | Maximum latency<br>Tolerated jitter<br>Minimum reserved traffic rate<br>Maximum sustained traffic rate<br>Traffic priority<br>Request/transmission policy<br>Unsolicited grant interval |
| nrtPS | Support non-real-time applications generating variable-rate data that require guaranteed rate but insensitive to delay. Provides regular request opportunities. | Minimum reserved traffic rate<br>Maximum sustained traffic rate<br>Traffic priority<br>Request/transmission policy |
| BE | Support applications generating variable-rate data with no rate or delay requirements. Uses unicast and contention request opportunities. | Maximum sustained traffic rate<br>Traffic priority<br>Request/transmission policy |

It is the role of the uplink packet scheduler to ensure that the requirements set for each active service flow, based on the configured parameter settings, are met by allocating resources for the MS CIDs appropriately. In particular in the case of the UL, the scheduler must also provide polling opportunities (enough BW to transmit a BW request) for the request of a grant to service flows with a polling interval (e.g. rtPS or nrtPS) or UGS connections with the PM bit set, or unsolicited grants based on the flow parameters.

In the UL the scheduler also needs to consider information received from the MS about its current requirements, these include:

PBR, PM, SI, FL & FLI bits in the grant management subheader (see below)

BR in the MAC signalling type I header (incremental or aggregate)

CDMA BW request

More details of these items of information are given in the table below:

| Field | Purpose |
|---|---|
| SI (UGS) | Slip indicator: flag to indicate service flow has exceeded the transmit queue depth. BS should respond by increasing the grant size by 1%. |
| PM (UGS) | Poll me: For UGS connection indicates to issue a polling opportunity for another connection. BS should grant BW to enable transmission of BR*. |
| FL/FLI (UGS) | Frame Latency: Number of frames ago that data was available. As long as FL is above a certain threshold, the BS should respond by advancing the next grant time. |
| BR/(PBR) | Bandwidth request (piggybacked): BS should use the information to update the BW needs of the connection. |
| CDMA BR | CDMA based BR: BS should respond with allocation for MS to issue BR (using CDMA allocation IE)*. |

*Note BR message requires a 6 byte allocation.

Supported Classes & Parameters

Table 4 indicates which parameters are mandatory, optional or not applicable for each service class:

TABLE 4

Supported service class parameters by type.

| Parameters | UGS | RT | ERT | NRT | BE |
|---|---|---|---|---|---|
| Min rate | O* | M | M | M | — |
| Max rate | M | M | M | M | O |
| Max latency | M | M | M | — | — |
| Jitter | M | — | O | — | — |
| Request/Transmission policy | M | M | M | M | M |
| Uplink grant scheduling type | M | M | M | M | M |
| Traffic priority | — | O | O | M | O |

TABLE 4-continued

Supported service class parameters by type.

| Parameters | UGS | RT | ERT | NRT | BE |
|---|---|---|---|---|---|
| Unsolicited grant interval | O | — | O | — | — |
| Unsolicited polling interval (UL) | — | O | — | — | — |

*Shall be set equal to the max rate

As will be apparent from the above description, the tasks of the UL and DL packet schedulers in a base station are considerably involved. However, for WiMAX systems to become successful commercially, base station functionality has to be provided at low cost. Consequently, there is a need to provide the above scheduling functions in a simple manner so as to minimise the processing capacity required and hence its cost.

More particularly, there is a need for a subsystem providing an LMAC scheduler and PDU builder in an efficient and cost-effective manner.

DISCLOSURE OF INVENTION

According to a first aspect of the present invention, there is provided a module for use in a base station of a wireless communication system in which packets of data are at least transmitted from the base station to a plurality of subscriber stations, the base station defining connections with the subscriber stations, each connection having one of a plurality of service classes, each service class having an associated QoS, the module allocating system resources available within a predetermined unit of time to each connection and comprising:

first-stage scheduling means responsive to the QoS requirements of the connections to determine connections that need to be scheduled within the predetermined unit of time to achieve their QoS;

second-stage scheduling means arranged to determine any other connections which are able to be scheduled within the predetermined unit of time, using any resources still available after allocating resources to those connections that need to be scheduled, and to assign a priority order of such other connections based on requirements other than QoS; and resource allocating means for allocating resources to each connection in accordance with the determinations made by the first-stage scheduling means and second-stage scheduling means.

In the above module, the requirements other than QoS may be determined by an operator of the wireless communication system. To vary the manner of scheduling the other connections, the module may include means for receiving information regarding the requirements other than QoS. The aim of the second-stage scheduling means may be to maximise spectral efficiency in the system, or a proportional-fair algorithm may be used to balance spectral efficiency with fairness to subscribers.

According to a second aspect of the present invention, there is provided a module for use in a base station of a wireless communication system in which frames of data are transmitted to a plurality of subscriber stations via the base station, the frames being divided timewise into a plurality of zones and each zone comprising a number of bursts, the base station receiving signals from and defining connections with subscriber stations within a plurality of adjacent regions and serving those connections by allocating resources within the frames, wherein the module comprises:

zone assignment means for receiving a signal level for each connection and performing zone assignment of the connection based on a comparison of said signal level with a threshold level, and a fractional frequency reuse manager for selecting the threshold level employed by the zone assignment means for zone assignment.

Such a module may be used, for example, in a base station having a three-sector antenna for serving adjacent hexagonal cells as said regions. In such a configuration, preferably, the zones include a Reuse 1 zone and a Reuse 3 zone where 1 and 3 denote reuse factors of frequencies among the cells, Reuse 1 indicating no re-use of frequencies among the cells and Reuse 3 indicating that the frequencies are divided into three sets of subchannels within the frequency band occupied by the zone, each set allocated to a different cell, and the threshold level is an optimal Reuse 3/Reuse 1 transition signal level.

Other aspects of the invention provide a subsystem including either or both of the modules as defined above, a base station having such modules or subsystem, a scheduling apparatus, a scheduling method, a wireless communication method, a wireless communication system and software for implementing the functions of the modules defined above, as set forth in the accompanying independent claims.

BRIEF DESCRIPTION OF THE DRAWINGS

Reference is made, by way of example only, to the accompanying drawings in which.

MODE(S) FOR CARRYING OUT THE INVENTION

An embodiment of the present invention will now be described with reference to FIGS. 7-11, using an IEEE 802.16 network as an example. First, there will be given a high-level description of the LMAC scheduler and PDU builder architecture that will enable the WiMAX basestation to ensure QoS delivery whilst maximising spectral efficiency. In short, this is achieved through a combination of connection based packet scheduling of enqueued packets based on the service flow type, associated parameters and requirements as well as consideration of the channel conditions. This is followed by an outline of some of the algorithms contained within each of the components associated with the scheduler and PDU builder.

Figure 7:
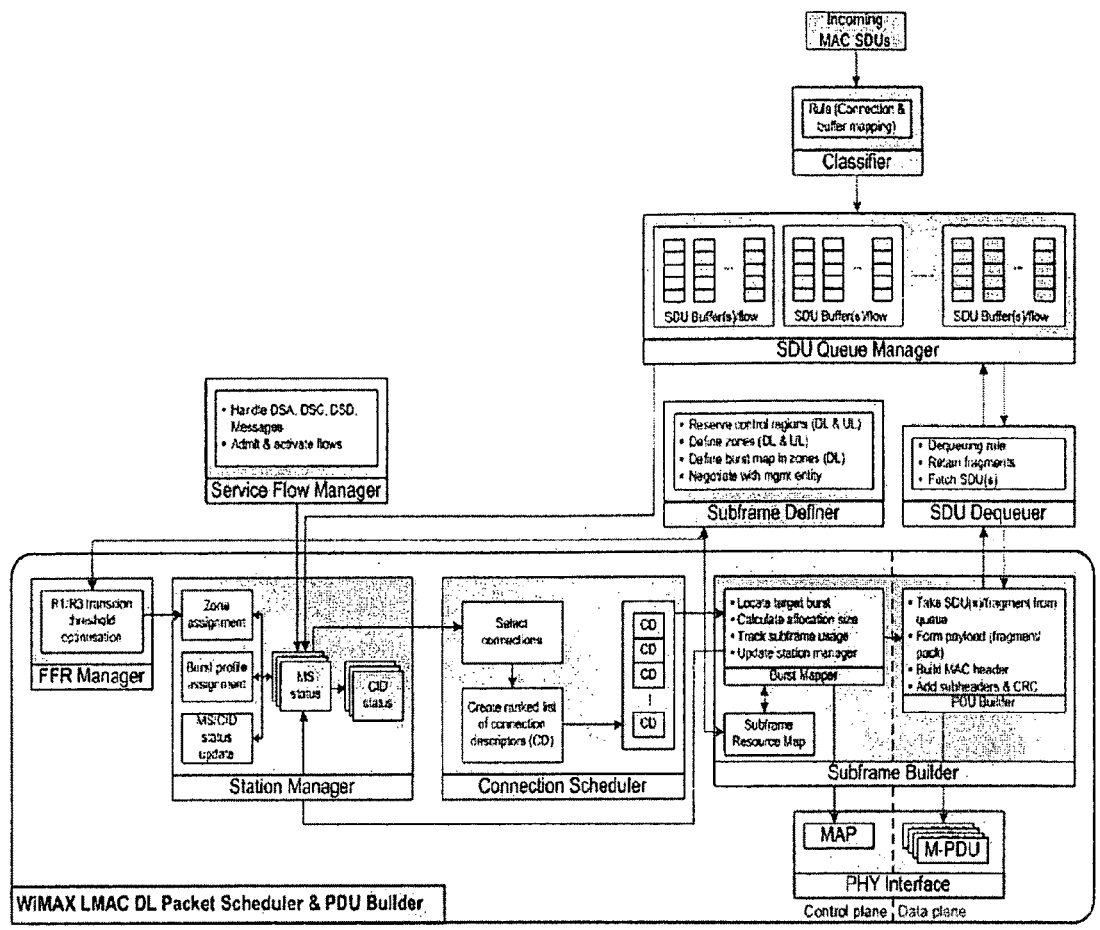
FIG. 7 shows the overall structure of a base station subsystem embodying the present invention.

FIG. 7 illustrates the high-level architecture of the WiMAX base station LMAC packet scheduler and MAC PDU builder for the case of the downlink. Note that for the case of the UL scheduler the elements that form the data plane are not required, as discussed below. In practice, however, the same processor will be used to implement both the DL scheduler and the UL scheduler, only the programming being changed.

Downlink Scheduler

The components of the downlink scheduler and PDU builder can be partitioned into being part of the data or control plane. The data plane consists of the following components:
  (Incoming Packet) Classifier
  SDU Queue Manager
  SDU Dequeuer
  PDU Builder (within the Subframe Builder)
  PHY Interface The collective operation of the data plane components is to queue and transform ingress (input) SDUs into egress (output) MAC PDUs to send to the PHY layer. In order to achieve this the PDU Builder function requires information from the Burst Mapper function to inform it how to operate.

The control plane consists of the following components:
  Service Flow Manager
  Subframe Definer
  SDU Queue Manager
  FFR Manager
  Station Manager
  Connection Scheduler
  Burst Mapper (within the Subframe Builder)

The collective operation of the control plane components is to provide the required input to the PDU Builder in the data plane for it to perform its function, and to construct the resulting MAP message with MAP IEs for sending to the PHY layer. This is ultimately provided by the Burst Mapper, which, as shown, relies on information from the other components in the control plane.

Uplink Scheduler

Whilst not illustrated, the functional components in the uplink scheduler consist of a subset of those in the downlink scheduler. In the case of the uplink there is no data plane in the BS, instead the equivalent of the DL components reside in the MS. Hence the UL architecture comprises the Service Flow Manager, Station Manager, Connection Scheduler and only the Burst Mapper of the Subframe Builder.

Figure 8:
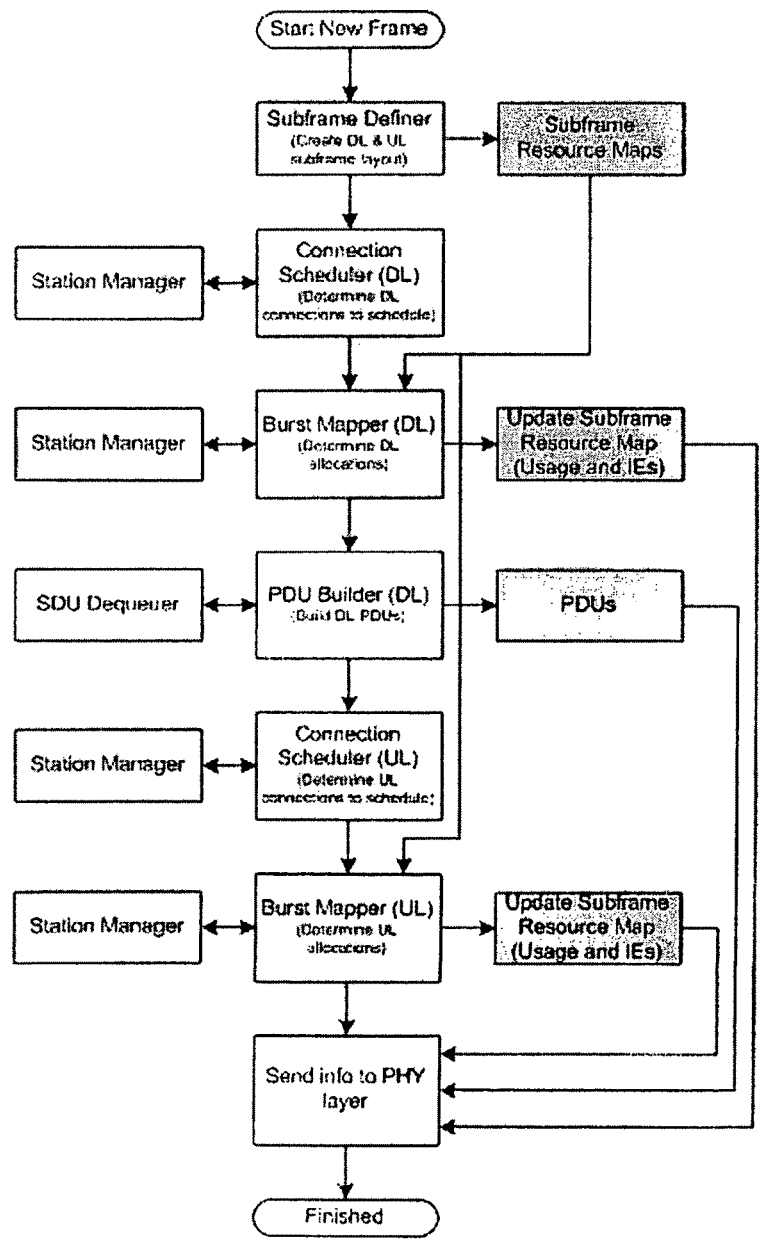
FIG. 8 is a flowchart of overall operation in the subsystem of FIG. 7.
Figure 9:
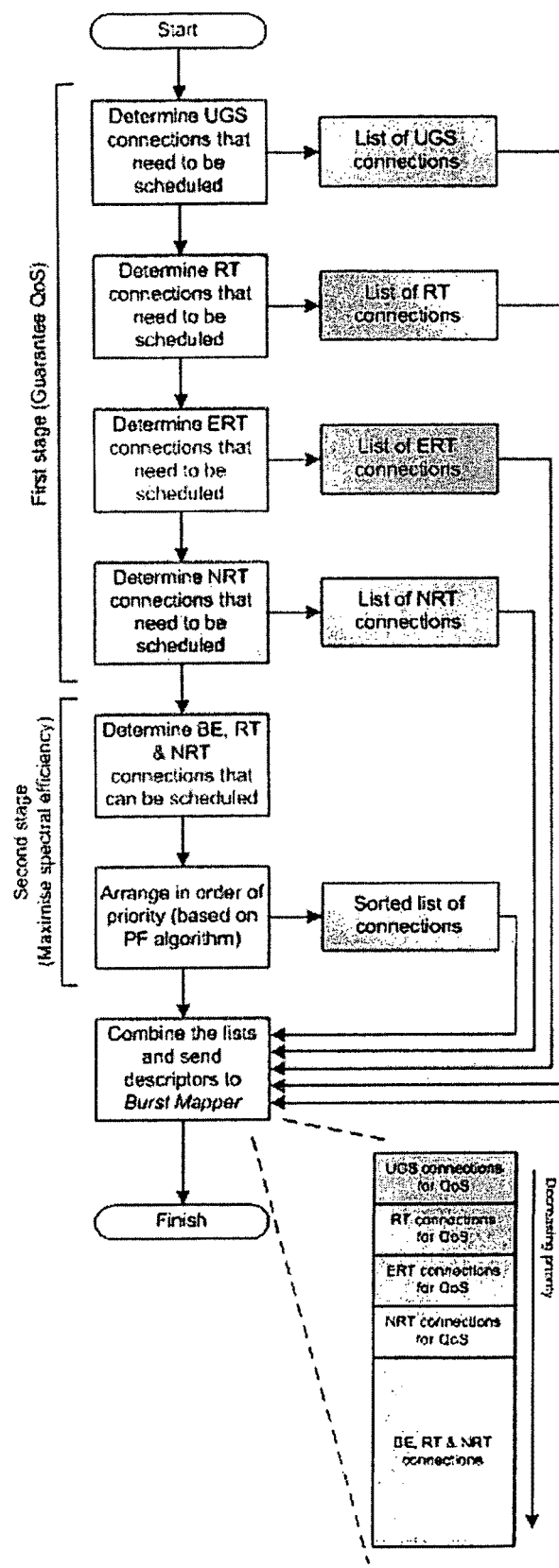
FIG. 9 shows a first aspect of operation of the FIG. 7 subsystem, relating to packet scheduling.

FIG. 8 provides a flowchart-based representation of the algorithm for connection scheduling and PDU building at a system level. The operation of each block in the flow chart is described in greater detail below.

High Level Component Description (i) Station Manager

For every admitted subscriber station the Station Manager maintains a data structure that contains the status information of the station, which itself contains data structures that contains the status information of the active management and transport connections. The information contained within the structures is at a minimum that required by the Connection Scheduler and Frame Builder.

The Station Manager also contains a number of functions that operate on the data structures. These include:
  Zone assignment: assigns a station to the appropriate zone within the subframe
  Burst profile assignment: assigns the burst profile for a station
  MS/CID status update: updates the station/connection status data structures The MS/CID Status Update function may be initiated when new status information is received (e.g. change to service flow, CINR report received, connection scheduled, new SDU received) and may also be run periodically to fetch and update information such as SDU queue length or latency information.

Note that the SDU information could alternatively be tracked, based on information from the Burst Mapper and SDU Queue Manager, as in theory, the information only needs to be updated from the SDU Queue Manager when either a new SDU arrives or an SDU is scheduled, the latency can otherwise be incremented each frame by the Station Manager. This information can be updated on an event basis, requiring explicit update information from the SDU Queue Manager, or on a periodic request basis to the SDU Queue Manager, along with the periodicity.

Based on the new information received, the function may initiate the Zone assignment or Burst profile assignment functions to update the current assignment.

It is assumed that the Zone Assignment function and Burst Profile Assignment functions are only dealing with SISO users. In order to design a framework for MIMO users (required for Wave 2 support) in the DL, to enable MIMO allocation, two approaches are:
  Set up separate SISO and MIMO zones using STC_Zone/DL_Zone_Switch_IE: Requires the Subframe Definer to set up separate zones.
  Configure MIMO bursts within a SISO zone using the MIMO_DL_Basic_IE or MIMO_DL_Enhanced_IE. Requires the Subframe Definer to set up a burst for MIMO allocation and for the Burst Mapper to allocate regions from within the burst to each MIMO scheduled connection.

(ii) Connection Scheduler

The Connection Scheduler is responsible for determining on a frame-by-frame basis which connections should be scheduled. This decision, which results in a list of Connection Descriptors (CD), is based on a number of input parameters available from the Station Manager. The overall operation aims to guarantee QoS as described by the active parameter set as well as maximise spectral efficiency.

The first function is to determine which connections should be scheduled as a high priority in order to ensure the minimum QoS guarantees are met. These connections are determined by extracting those which, if not scheduled in the current frame, will miss minimum QoS requirements. This first part starts by analysing the connections on a service class basis, starting with UGS connections first, then RT, ERT and finally NRT connections. Once scheduling to meet minimum QoS is complete, the second stage creates a ranked list of the remaining connections to consider allocating resource to in this frame. This ranked list is then appended to the list of connections extracted as part of the first stage.

The Connection Scheduler then passes this list of ranked Connection Descriptors, which are data objects, to the Burst Mapper. These data objects contain the information required by the Burst Mapper in order to determine the size of the grant that is provided subsequently to the PDU Builder.

The method used for arriving at the ranked list of Connection Descriptors is described in further detail in FIG. 8. A high level flow chart description is provided by this Figure, which indicates the two stages executed by this component and the structure of the resulting list of Connection Descriptors.

(iii) SDU Dequeuer

The SDU Dequeuer is responsible for providing SDUs (or fragments) to the PDU Builder, on request, fetching the SDUs (or fragments) from the appropriate SDU queue for the requested connection and also retain any SDU fragments made as a result of the operation of the PDU Builder. Note the SDU Dequeuer, SDU Queue Manager and Classifier may be designed in such a way to enable handling of ingress packets with varying priority on any one connection.

(iv) Classifier & SDU Queue Manager

The Classifier will take ingress SDUs and place them into the appropriate buffer. The SDU Queue Manager is responsible for monitoring queue length and SDU latency and informing the Station Manager of this information, on request. It also provides notification to the Station Manager of the arrival of new data into a previously empty queue. This latter function enables the Station Manager to update the MS/CID Status on the event that data becomes pending in the SDU buffer.

(v) Subframe Builder

The Subframe Builder consists of two components, a Burst Mapper and a PDU Builder, and one data structure (Subframe Resource Map), as explained below.

The Subframe Builder will work serially through the ranked list of Connection Descriptors, supplied by the Connection Scheduler, until one of the following stop conditions is met:

Time limit for subframe construction is reached

End of the CD list is reached

No more resource left in the bursts

No more resource left in the region allocated for the MAP messages

The Burst Mapper is responsible for determining the target burst within the assigned zone into which the scheduled connection's PDU will be mapped. It also calculates the allocation size within that burst based on a number of input parameters, as described in further detail below. Once mapped, the Burst Mapper will update the Subframe Resource Map to indicate that the resource is being used in this subframe. It will also update the MAP IE in the DL case and make the IE in the UL case. These IEs are stored in the downlink Subframe Resource Map.

The Burst Mapper will inform the Station Manager of the allocation of resource so that the Station Manager can update the appropriate elements in the MS/CID Status data structures. The Burst Mapper also informs the PDU Builder of the size of PDU to be built for this connection as well as some other supported information.

The PDU Builder is responsible for building the PDU to the size specified by the Burst Mapper. When determining the payload size available for SDU(s), it will set some of the PDU size for the MAC header, subheaders and CRC. It will inform the SDU Dequeuer of the maximum size of data it can accept into the payload. The SDU Dequeuer will then return SDUs (with possibly a fragment at the beginning or end) taking into account the overhead required to include the necessary fragmentation or packing subheaders (i.e. 8 or 16 bits depending on extended type & ARQ usage). The PDU Builder will then construct the PDU and append the CRC, if appropriate.

Subframe Resource Map

This is a data structure that contains a logical map of the subframe. The map will consist of regions set aside for control (e.g. MAPs, ranging, CQICH, ACK, etc) and regions for transport traffic (e.g. data bursts) as defined by the Subframe Definer described below.

In the DL subframe case it will contain a hierarchical map of the zones and the bursts within the zones that are defined for the subframe by the Subframe Definer. It should also keep track of the construction of the MAP message as allocations are made by the Burst Mapper. In the DL case, most of the content of the MAP IEs will be predefined, however, as the Burst Mapper makes allocations within a burst, the Burst Mapper will update the CID list in the MAP IEs contained in the Subframe Resource Map.

In the UL subframe case it will contain a hierarchical map of the zones that are defined for the subframe. It will also enable access to the portion of the DL Subframe Resource Map that contains the UL MAP message. As the Burst Mapper makes burst allocations, it will update the usage of the appropriate data zone as well as inserting a MAP IE into the UL MAP contained in the DL Subframe Resource Map.

(vi) Service Flow Manager

The Service Flow Manager is responsible for managing the admission and activation of service flows, which it performs using an admission control algorithm. Its main function with respect to the scheduler is to inform the Station Manager of addition, change or deletion of active service flows for which bandwidth must be provisioned.

The Service Flow Manager should take the responsibility of flow admission control, and thus the admission control algorithm may also require feedback from the Station Manager or Connection Scheduler about the availability of excess radio resource. The Service Flow Manager will determine and manage the setting of the QoS parameter set for each service flow. It will then inform the Station Manager of these values when a service flow is active.

(vii) Subframe Definer

The Subframe Definer is responsible for defining layout of subframes and storing this in the Subframe Resource Map in the Subframe Builder. It will reserve resource for control messages including:

FCH/MAPs in the DL subframe

CQICH, ACKCH, Ranging in the UL subframe

It may also set aside other regions to be used by the PHY layer. For example sounding zones, PAPR reduction or Gap zones (DIUC or UIUC 13). In conjunction with the network management entity responsible for co-ordination of system wide resource usage, it will also define the number and location of zones within the DL & UL subframes. Finally within the DL zones it will determine the layout of the bursts before the Burst Mapper begins allocation of resources and construct the MAP messages, including the DL MAP IEs with empty CID lists, prior to the Burst Mapper beginning allocation.

The Subframe Definer will either monitor the Subframe Resource Map frame-by-frame or communicate with Burst Mapper to determine the current usage of the bursts, zones and subframe to either generate changes locally or provide reports to the Network Management Entity on potential system wide changes to effect. Consequently, in the DL case, this layout may be dynamically adjusted based on monitoring the current usage of the bursts in the subframe and the list of burst profiles defined in the DCD message.

(viii) FFR Manager

Figure 11:
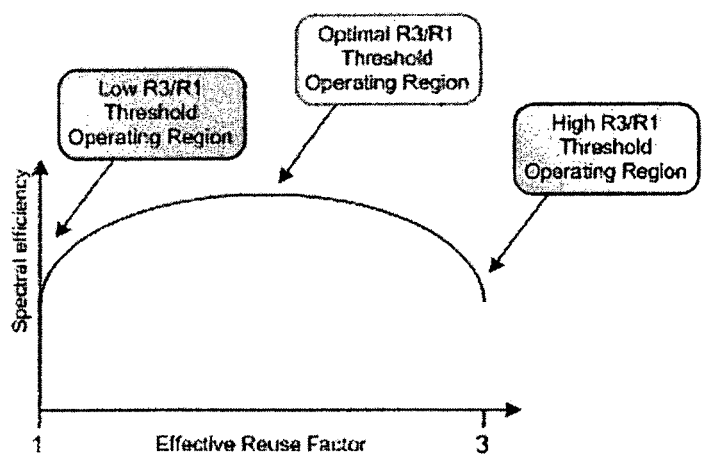
FIG. 11 shows the relationship between spectral efficiency and effective reuse factor in a Reuse 3/Reuse 1 configuration.

FIG. 11 shows the arrangement of a DL subframe for supporting fractional frequency re-use (FFR). It is expected that the zone switch point between a "Reuse 3" and "Reuse 1" zone will be coordinated throughout the network, as shown in FIG. 11, so that the Subframe Definer is responsible for setting the Reuse 3 and Reuse 1 zone transition point in conjunction with the network management entity. The role of the FFR Manager is to optimally select the threshold used by the Zone Assignment function in the Station Manager to determine whether an MS is assigned into either the "R3" or "R1" zone. This allows the system to operate in an optimal operating region as shown in FIG. 11. Further details on the Zone Assignment algorithm and the threshold calculation algorithm are given below.

"LMAC Schedule of PDU Builder Component Description"

The key components of the WiMAX BS scheduler and PDU builder will now be described in more detail.

(a) Station Manager

The Station Manager consists of three functions and a number of data structures. These are described separately in the following subsections.

MS Status Data Structure

This structure maintains the current status of parameters that are specific to an MS but apply to all of its connections (or service flows). The parameters included are:

| Parameter | Usage |
|---|---|
| DL Preamble Physical CINR (Reuse 1 config) | Used by Zone Assignment function |
| DL Preamble Physical CINR (Reuse 3 config) | Used by Zone Assignment function |
| DL Pilot Physical CINR | Used by Burst Profile Assignment function |
| DL Averaged Pilot Physical CINR (for PF) | Used by Connection Scheduler |
| UL Pilot CINR | Used by Burst Profile Assignment function |
| UL Averaged Pilot CINR | Used by Connection Scheduler |

The MS Status Data Structure also contains a CID Status Object for each active connection.

The PHY layers at the BS and MS may support physical CINR reporting only (Wave 1) or may additionally support effective CINR reporting (Wave 2). The MS Status Data Structure can be extended to contain either physical or effective CINR measurements, rather than just physical CINR.

CID Status Data Structure

This data structure is used to maintain the current status of parameters that are specific to an MS's connection (or service flows). The parameters included are:

| Parameter | Usage |
|---|---|
| State | Sleep or active. Used by Connection Scheduler. |
| Next Listening Window | If in sleep mode this is used by Connection Scheduler. |
| Service flow scheduling type | Used by Connection Scheduler to prioritise connection. |
| QoS Parameter Set (see Table 2) | Used by Connection Scheduler and Burst Mapper to determine when and how much to grant based on comparison with current QoS metrics. |
| Current QoS metrics{ | |
|   Next Grant Time | Used by Connection Scheduler. |
|   Last Grant Time | Used by Connection Scheduler and Burst Mapper. |
|   Last Grant Size | Used by Connection Scheduler and Burst Mapper. |
|   Next Poll Time | Used by Connection Scheduler. |
|   Maximum Allowed SDU Latency | Used by Connection Scheduler. |
|   Current Maximum SDU Latency (DL) | (Maximum time any of the SDU(s) have been in the queue). Used by Connection Scheduler. |
|   Number of SDUs experiencing Maximum SDU Latency (DL) | Used by Burst Mapper. |
|   Number of bytes in SDUs experiencing Maximum SDU Latency (DL) | Used by Burst Mapper. |
|   SDU Buffer Size (DL) | Used by Connection Scheduler & Burst Mapper |
|   Requested BW (UL) | Used by Connection Scheduler and Burst Mapper (in same way as SDU Buffer Size is in DL) |
|   FL (UL) | Used by Connection Scheduler and Burst Mapper. |
|   PM (UL) | Used by Connection Scheduler. |
|   SI (UL) | Used by Connection Scheduler and Burst Mapper. |
| } | |

The Maximum Allowed SDU Latency is calculated based on the Maximum Latency setting in the QoS parameter set. The Maximum Latency is the CS peer-to-peer latency, so the Maximum Allowed SDU Latency needs to take into account the extra delay between scheduling of the SDU and arrival at the CS peer. The Station Manager will make this calculation of Maximum Allowed SDU Latency.

MS/CID Status Update

This function is responsible for updating the MS Status and associated CID Status data structures based on an event. The events that cause update are:

| Event | Informed By | Parameter(s) Updated |
|---|---|---|
| New packet in DL SDU queue | SDU Queue Manager | SDU buffer size |
| CQI report | PHY Layer | Pilot CINR Preamble CINR (R = 1 or R = 3) (DL) Average Pilot CINR |
| Successful grant allocation | Burst Mapper | Next Grant Time Last Grant Time Last Grant Size |
| UL PDU received | | SDU Buffer Size (DL)/ Requested BW (UL) FL (UL) PM (UL) SI (UL) Requested BW (UL) |
| (Periodic) | N/A | Maximum SDU Latency (DL) |

CQI Report Event

In the event a CQI report on the pilot CINR is received then the Average Pilot CINR will be updated. The equation used for updating is:

$$CINR_{av}[k] = \begin{matrix} CINR[k] & k = 0 \\ (1-\beta)CINR_{av}[k-1] + \beta CINR[k] & k > 0 \end{matrix}$$

where $CINR_{av}[k]$ is the average pilot CINR in frame k; CINR [k] is the pilot CINR in frame k; and β is a forgetting factor that needs to be set appropriately.

Simulation could be used to arrive at an optimal setting for β in order to ensure the average CINR used by the proportional fair algorithm is appropriate. If the averaging window is too long then the proportional fair algorithm becomes like a round robin, hence does not provide any spectral efficiency gain, whilst if it is too short it becomes like maximum C/I, hence does not provide any fairness.

Successful Grant/Polling Allocation Event

In this case of successful grant the Last Grant Time is set equal to the current time. The SDU Buffer Size or Requested BW will be decremented by the number of SDU bytes allocated. If the service has the Unsolicited Grant Interval configured, the Next Grant Time is then set based on the current time plus the Unsolicited Grant Interval. Finally, if the service has the Next Poll Time configured, then it is updated based on the current time plus the Unsolicited Polling Interval. In the case of a successful polling allocation the Next Poll Time is set equal to the current time plus the Unsolicited Polling Interval.

Zone Assignment (FFR)

Whenever a preamble CINR report is received the Zone Assignment function is called by the MS/CID Update function. The operation of the zone assignment function depends on whether the MS is current located in a reuse 1 or reuse 3 zone.

In this subsection $CINR_1$ is used to refer to a CINR measurement made on the preamble for reuse configuration 1 and $CINR_3$ refers to a CINR measurement made on the preamble for reuse configuration 3.

Reuse 3 operation

If the MS is currently allocated in a reuse 3 zone then the Zone Assignment function will check if the $CINR_1$ report is above a R1/R3 transition threshold. If it is then the Zone Assignment function will allocate the CID into the R1 zone. If not then the connection remains in the R3 zone. The Zone Assignment function then schedules the PHY layer to perform the next periodic check of the $CINR_1$.

Reuse 1 Operation ($CINR_1$ Report Received)

If in reuse 1 zone then the Zone Assignment function will check the $CINR_1$ report is below an R1/R3 transition threshold. If it is then the Zone Assignment function will request a measurement of CINR3. If not then the connection remains in the R1 zone. The Zone Assignment function then schedules the PHY layer to perform the next periodic check of $CINR_1$.

Reuse 1 Operation ($CINR_3$ Report Received)

If the $CINR_3$ report is higher than the $CINR_1$ report then the Zone Assignment function will allocate the CID into the R3 zone. The Zone Assignment function then schedules the PHY layer to perform the next periodic check of $CINR_1$. One possibility for obtaining the report is to set up a periodic CQI reporting via CQICH for the $CINR_1$ report. REP-REQ/RSP can then be utilised for obtaining a $CINR_3$ report as and when required.

Burst Profile Assignment

Whenever a pilot CQI report is received the Burst Profile Assignment function is initiated by the MS/CID Update function to ensure correct burst profile assignment for the MSs connections. As only physical CINR measurement on pilot subcarriers is supported in Wave 1 by the MS, burst profile assignment algorithm will utilise this metric.

The Burst Profile Assignment function will determine the optimal burst profile format from a list of active burst profiles based on using a look up table of the physical CINR. As it is expected that the mapping of burst profile to CINR will vary with channel type, it is expected that a number of look up table may be required.

(b) FFR Manager

The role of the FFR Manager is to maximise the spectral efficiency of the system. In general it is expected that as the effective spectral efficiency of a system will vary with effective reuse factor, as shown in FIG. 11.

Figure 1:
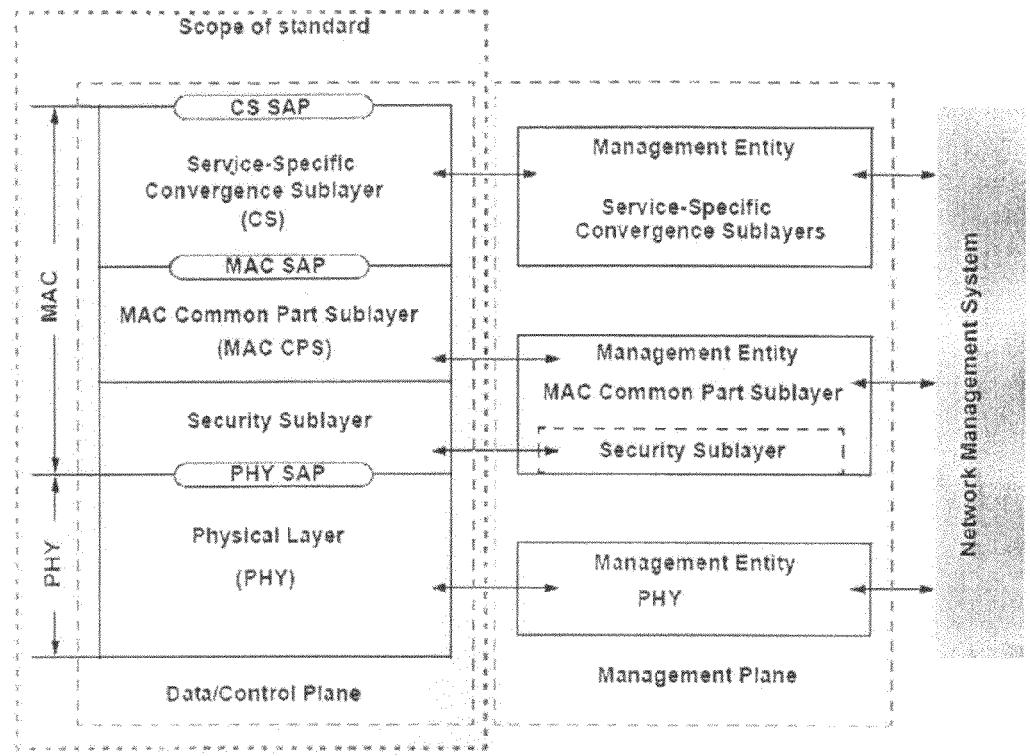
FIG. 1 shows protocol layering in accordance with IEEE 802.16.
Figure 2:
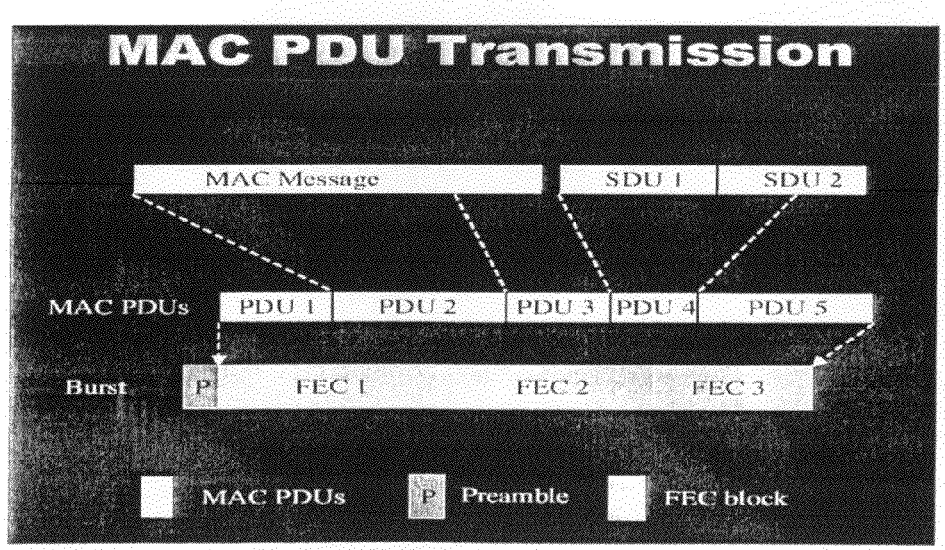
FIG. 2 shows the relationship between SDUs, PDUs and bursts in an IEEE 802.16 wireless communication system.
Figure 3:
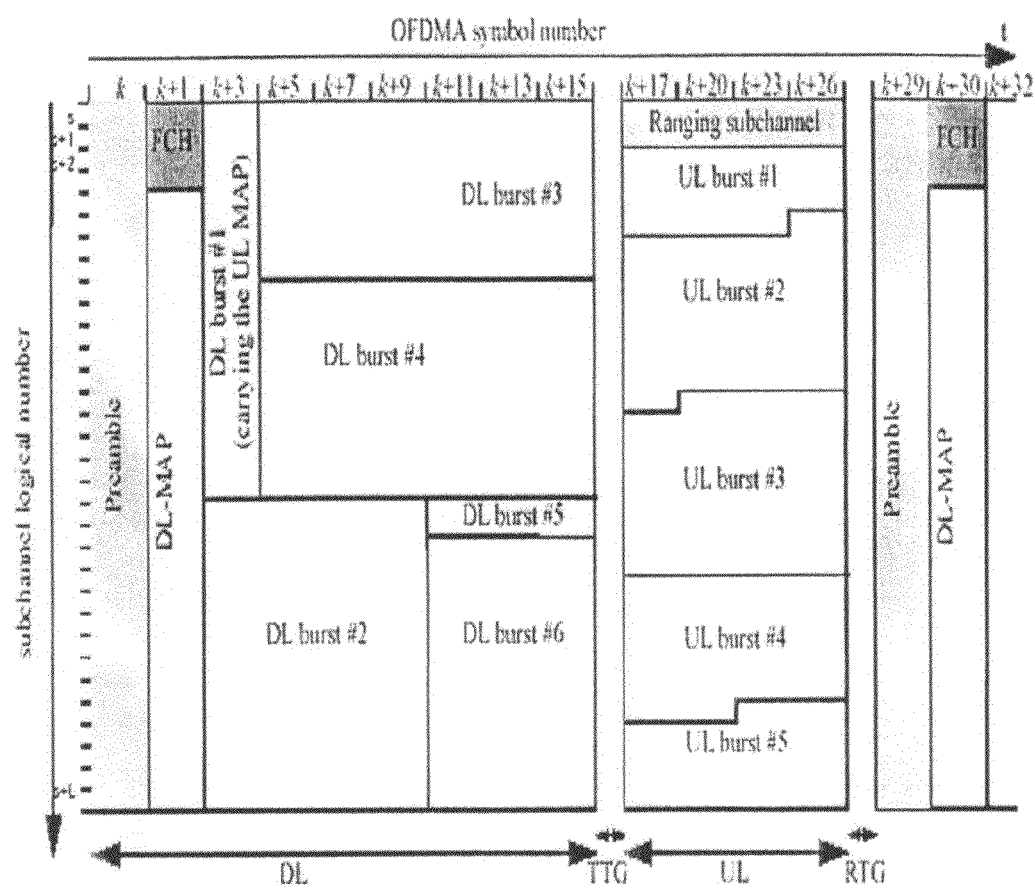
FIGS. 3 and 4 are for explaining a TDD mode frame format used in an IEEE 802.16 wireless communication system, FIG. 3 showing the frame structure in terms of bursts and FIG. 4 showing the structure in terms of PDUs.
Figure 4:
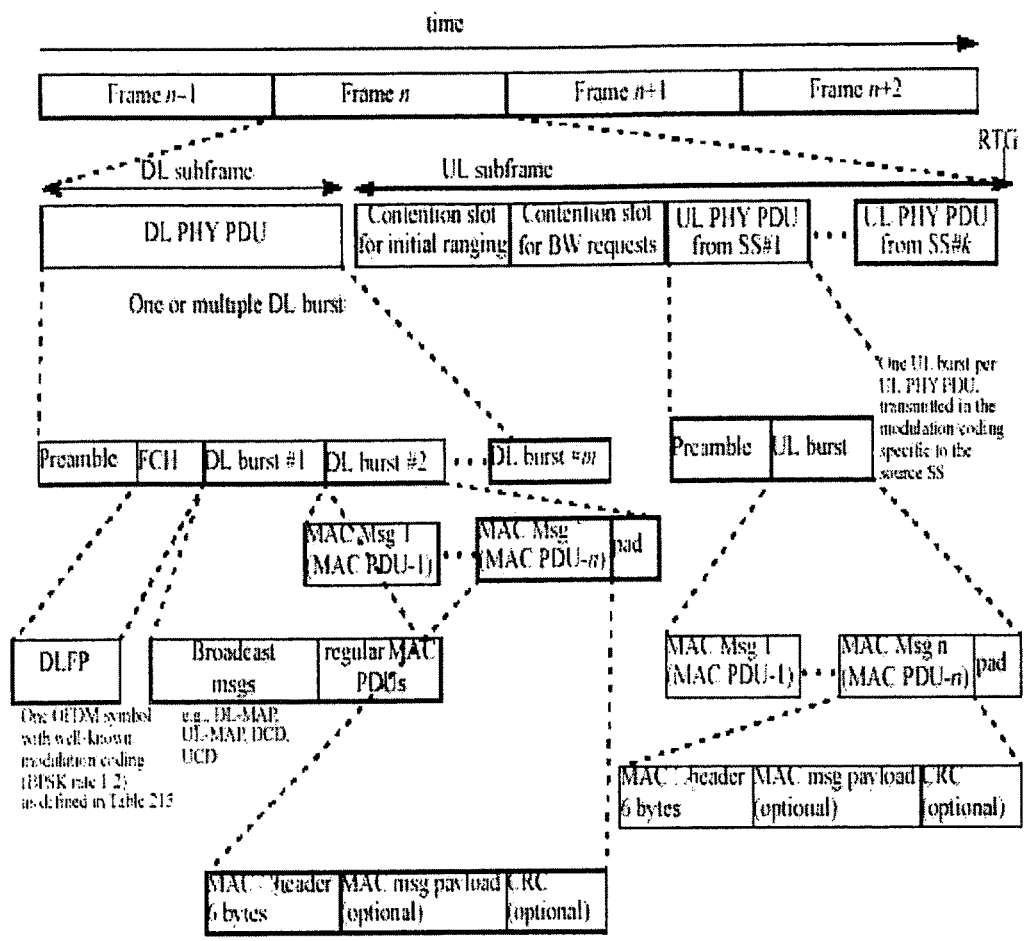
Figure 5:
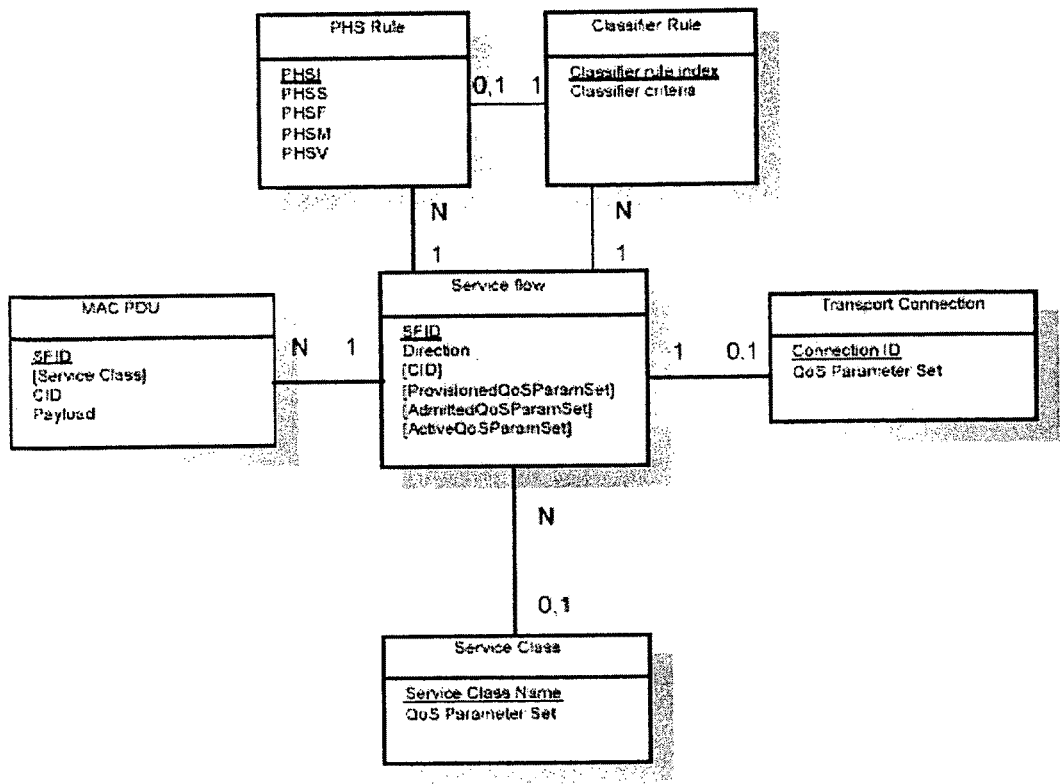
FIG. 5 shows the relationship between CID, SFID and QoS in an IEEE 802.16 network.
Figure 6:
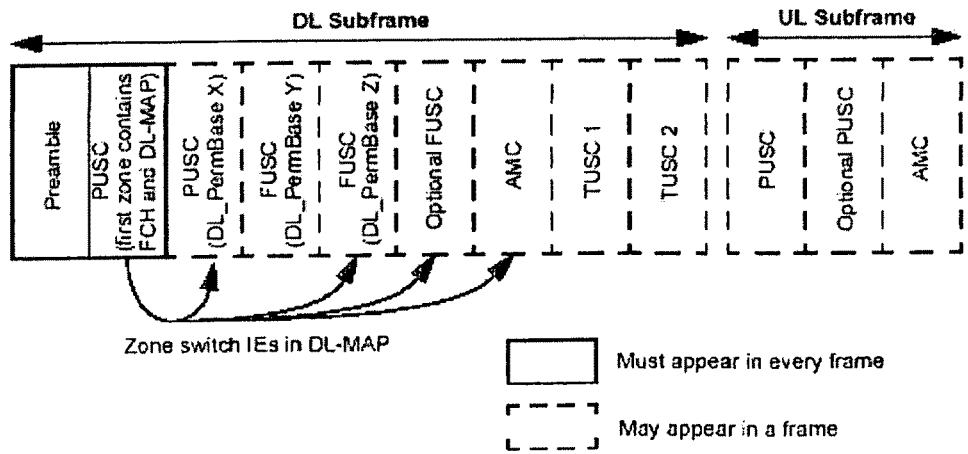
FIG. 6 shows schematically a modified frame format in the case of frequency re-use.
Figure 10:
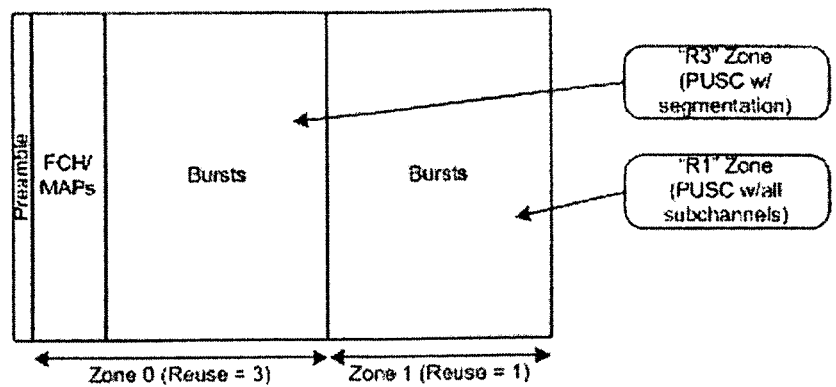
FIG. 10 illustrates a frame format used in a so-called Reuse 3/Reuse 1 base station configuration.

Conventionally, an OFDMA frame in an IEEE802.16 system starts with a Reuse 3 zone since this is defined as the transmission mode for the frame preamble (see FIGS. 3 and 10). The FFR Manager is responsible for selecting the optimal R3/R1 (Reuse 3/Reuse 1) transition CINR as used by the Zone Assignment function in the Station Manager so as to maximise spectral efficiency through maximise the OTA (over-the-air) throughput (i.e. the number of payload bits sent to the PHY layer).

If the threshold is set too low, all users will be in Reuse 1 zone. Interference will cause some users around sector edges to experience low CINR and hence burst profile will be set to be very robust resulting in lower throughput. Conversely, if the threshold is set too high, all users will be in Reuse 3 zone. Whilst this will ensure best throughput for every user at a link level, the number of slots available for allocation is a third of that available in the former case, hence system throughput will be compromised. Consequently, by monitoring the impact of adjusting the threshold on OTA and using a simple gradient descent based algorithm it will be possible for the FFR Manager to optimally adjust the transition point.

(c) Connection Scheduler

In order to ensure the QoS requirements are met, the Connection Scheduler begins by considering connections assigned to the UGS service type, it then progresses through the connections assigned to the real-time, extended real-time, non-real-time and finally best effort service types.

For each service type the Connection Scheduler needs to determine if that connection should be scheduled in this frame based on analysing the Current QoS Metrics against the QoS Parameter Set. The algorithm for determining this for each service type is considered in the following subsections. The description focuses on the downlink connection scheduler first, highlighting the differences for the case of the uplink connection scheduler.

If the Connection Scheduler determines that it is not necessary to schedule the connection in this frame, but the connection could be granted bandwidth if there is available resource then the connection is put aside, until the requirements of the remaining connections are considered. Further details on the method for determining whether the connection should be considered after all others are provided in the following subsections.

Note that in all connections in the DL, if the SDU Buffer Size for that connection is zero or the connection is in sleep state and the current frame is not a listening window then the connection will not be scheduled. Likewise in the UL, if the Requested BW is zero and the connection is not due to be issued an unsolicited grant or polled, or the same sleep condition described for DL exists, then the connection will not be scheduled.

For the case of a contention based CDMA bandwidth request, as can be received on ERT, NRT or BE connections, it is assumed the reservation of resource and insertion of a CDMA_Allocation_IE into the UL MAP will be taken care separately from the Connection Scheduler. Resource allocation for the CDMA_Allocation_IE will be made before the Burst Mapper allocates resources for scheduled connections. Note a maximum number of connections per frame may also be set due to MAC layer resource limitations.

The connection scheduler handles connections of the various service classes, outlined in the introduction, as follows.

UGS

The connections assigned to the UGS service type will have the following QoS parameters configured that relate to deciding whether or not to schedule the connection:

Tolerated jitter
Maximum latency
Request/Transmission policy
Unsolicited grant interval The Connection Scheduler will check if the Next Grant Time is due in this subframe (or expired) or if the Maximum Allowed SDU Latency will be exceeded if the connection is not scheduled in this frame. If it is then this connection will be considered for scheduling in this frame. If neither of these events will occur then the connection will not be scheduled in the current frame.

Once all UGS connections have been considered, the connections scheduled for the current frame are ranked based on Latest Grant Time, where:

Latest Grant Time=min(Next Grant interval+Tolerated Jitter, Next Grant Interval+Max. Allowed SDU Latency−Current Max. SDU Latency)

The ranking is then in order of increasing Latest Grant Time.

For the UL case, the SDU latency can be obtained via the FL field in the CID status. If the FL is equal or greater than the Max Allowed SDU Latency then the connection will be scheduled in this frame.

Real-Time (RT) Service

The connections assigned to the RT service type will have the following QoS parameters configured that relate to deciding whether or not to schedule the connection:

Maximum latency
Minimum reserved traffic rate

The Connection Scheduler will check if the SDU Latency will be exceeded if the connection is not scheduled in this frame (i.e. if Maximum Allowed SDU Latency−Current Maximum SDU Latency<Frame Duration). If it is then this connection will be considered for scheduling in this frame. It will also check if the Minimum Reserved Traffic rate will not be met if the connection is not scheduled this frame by calculating Current Minimum Rate using:

Current Minimum Rate=Last Grant Size/(Next Frame Time−Last Grant Time)

The connection will be scheduled if Current Minimum Rate<Minimum Reserved Traffic Rate. If neither condition exists then the connection will be reconsidered after the remaining service classes have been considered. In the UL case, the BS needs to provide regular polling opportunities based on the Unsolicited Polling Interval. To support this the Connection Scheduler will schedule the connection if the Next Poll Time is scheduled (or expired) in this frame. The BS also needs to ensure that the Minimum Reserved Traffic Rate is met in the same way as for the UL. Therefore, in the UL the connection is also scheduled if the Current Minimum Rate<Minimum Reserved Traffic Rate.

Extended-Real-Time (ERT) Service

The connections assigned to the ERT service type will have the following QoS parameters configured that relate to deciding whether or not to schedule the connection:

Maximum latency
Tolerated jitter
Minimum reserved traffic rate
Unsolicited grant interval The same mechanisms described above for UGS and RT can be used to determine if the connection should be scheduled based on grant interval, latency and minimum rate. Further, selected connections will be ranked based on the criterion used for UGS. If none of the conditions exists then the connection will not be scheduled in this frame.

In the UL case, the Connection Scheduler will use the same mechanisms as described above for UGS and RT to determine in the connection should be scheduled based on interval or rate. Note that in the UL case ERT does not provide polling opportunities, it always provides grants. The grants can be used to request additional bandwidth.

Non-Real-Time (NRT) Service

The connections assigned to the NRT service type will have the following QoS parameters configured that relate to deciding whether or not to schedule the connection:

Minimum reserved traffic rate

The same mechanism as for RT is used to determine if the connection should be scheduled based on minimum rate guarantee. If the condition is not met then the connection will be reconsidered after the remaining service class has been considered. In the UL, the Connection Scheduler should provide poll opportunities, however the rate of polling can be of the order of 1 second. Therefore in UL case the connection will be scheduled if required to ensure minimum rate requirements or the Next Poll Time is due (or expired).

Best Effort (BE) Service

The connections assigned to BE and those assigned to RT and NRT that were not scheduled in order to meet QoS demands are considered last. As the preceding mechanisms will result in allocation of resource to meet the minimum QoS demands, the remaining resource is allocated so as to maximum spectral efficiency whilst maintain a certain degree in fairness of being allocated part of the remaining resource.

Before doing this the Connection Scheduler will also add to the list of remaining connections all of the RT and NRT connections scheduled by the mechanisms outlined above in connection with those service classes. This is to support the operation of the PDU Builder which first of all allocates minimum resource required to guarantee QoS. Once this is done it then allocates remaining resource to maximum spectral efficiency, hence the RT and NRT connections already allocated the minimum can be considered for an increase in grant size, in the same manner the unscheduled connections are considered.

The list of connections is then sorted, for example using the proportionally fair criteria. The first step is to calculate the connection weight for each connection in the list i:

$W_i$=Last recorded $CINR$/(Averaged $CINR$)

The connections are then sorted in order of decreasing $W_i$. order to ensure fairness is maintained when many connections have the their weights within the same range, the Connection Scheduler could optionally sort a list these connections based on Last Grant Time. In the UL, the same mechanism is used to determine whether to schedule the remaining connections.

The above mechanism for sorting the unscheduled connections may be replaced (or have its criteria modified) by the system operator so as to favour particular applications.

Other Tasks

Once each service type has been considered a list of Connection Descriptors is constructed. This is an ordered list, starting with descriptors of the UGS connections at the top, followed by the descriptors of the RT, ERT, NRT connections in strict order. The list of sorted BE connections is then appended to it to form the complete list of Connection Descriptors supplied to the Subframe Builder. Incidentally, in some systems it may be preferred to give ERT priority over RT in the ordered list.

The Connection Descriptors consist of the following information:

Pointer to CID Status (so the parameters can be accessed)
Reason for Scheduling: Grant Interval, Latency, Min Rate, None, (Polling in UL)

The Reason for Scheduling is then used by the Burst Mapper to determine the method used to calculate the Grant Size for this CID, as the algorithm will depend on the Service Type in the QoS parameter set and the Reason for Scheduling (more details are given below under the heading "Burst Mapper"). Reason 'None' indicates there was no minimum QoS requirement causing scheduling of this connection in the frame.

(d) Burst Mapper

The Burst Mapper builder will go through the list of Connection Descriptors provided by the Connection Scheduler in order. It will execute the following algorithm for each connection in order to arrive at the PDU size allocated, sent to the PDU Builder, and the MAP IE update (or generation in UL case):

1. Locate the target burst for the connection (based on searching within the assigned zone for a burst with the assigned burst profile). (Note: the limit of 256 connections per burst must be observed).
2. Once a burst is found determine the maximum remaining resource in slots.
3. Calculate the maximum allowed PDU allocation based on the available slots and burst profile format assigned.
4. Use the appropriate algorithm for determining the actual PDU size based on the service class (as described in the following subsections). Note the allocated size will never exceed the minimum of the amount of SDUs remaining in the SDU buffer or the amount of resource available in the target burst. In the case of the UL it will not exceed the amount of BW requested for the case of non-UGS connections (note the exception is if the allocation is for polling, in which case if no requested BW is outstanding the allocation will be 6 bytes). Also the burst size must take into account the Request/Transmission policy set for the connection as it may prevent fragmentation and/or packing, in which case the Burst Mapper must determine the size of the next SDU and use this to limit the allocation size.

Once the Grant Size has been determined for each connection, the MAP message is updated appropriately. In the DL, the IE describing the burst is updated to include the CID of the connection. In the UL, an IE is inserted into the UL MAP if this is the first connection being scheduled, if it is a further connection being scheduled then the allocation size recorded in the IE is incremented by the Grant Size (as there will only be one IE per MS in the UL). The Burst Mapper will terminate its process of the list of Connection Descriptors if any of the stop conditions listed above are met. In more detail, the Burst Mapper processes the connections of different service classes as follows.

UGS

The UGS connections will have been scheduled either because it is their grant interval or the SDU latency is about to be exceeded. If it is because of the former, the Grant Size can be calculated from the Maximum Sustained Traffic Rate (which is equal to the minimum) and the Unsolicited Grant Interval:

Grant Size=Traffic Rate*Unsolicited Grant Interval

If the connection is scheduled because of the latter scenario then the Grant Size is equal to the amount of data contained in the SDUs that are about to exceed the latency requirements (i.e the size of Number of Bytes in SDUs Experiencing Maximum Delay, plus any subheaders required to support packing (if multiple SDUs are to be scheduled, as determined by the value of Number of SDUs Experiencing Maximum Delay).

If the selected burst cannot support a grant of this size then the Burst Mapper should attempt to locate another suitable burst into which the allocation can be made. If no bursts can be found then the Grant Size will be scaled to fit the largest maximum allowed PDU size found in all potential target bursts. In case of UL, the same method is used. However, if the SI bit is set in the CID Status then the BS will over allocate by assigning 101% of the Grant Size.

Real-Time (RT) Service

The RT connections will have been scheduled either because it is their SDU latency is about to be exceeded or the Minimum Reserved Rate will not be met. If it is because of the former, then the Grant Size is calculated in the same way as described above. If it is because of the latter then the size needs to ensure minimum and maximum rate requirements are met. Therefore the grant should be bounded by:

Minimum Reserved Traffic Rate*(Current Time−Last Grant Time)<Grant Size<Max Sustained Traffic Rate*(Current Time−Last Grant Time)

In order to maintain minimum QoS requirements at first, at this stage the Grant Size is set to ensure the Minimum Reserved Traffic Rate requirements are met. The connection can then be considered again after the remaining service types have been considered for allocation of further bandwidth. In the UL, the connection will have been scheduled either because the Minimum Reserved Traffic Rate will not be met or an Unsolicited Polling Interval is due. For the former the same method is utilised to calculate the grant size. For the latter, the Grant Size is set equal to 6 bytes (to allow BW Request Header to be transmitted). Note extra BW might be allocated in the mechanism described below for BE service.

Extended-Real-Time (ERT) Service

The ERT connections will have been scheduled either because it is their grant interval, the SDU latency is about to be exceeded or the Minimum Reserved Rate will not be met. If it is either of the first two cases then the mechanism described for UGS is utilised to calculate the grant size, otherwise the mechanism for rate, as for RT is utilised.

In the UL case, it will have been scheduled either due to grant interval or minimum rate requirements. The appropriate mechanism already described for both cases of UGS and RT for the UL is utilised.

Non-Real-Time (NRT) Service

The NRT connections will have been scheduled either because the Minimum Reserved Rate will not be met unless scheduled. The Grant Size is therefore calculated using:

Grant Size=Minimum Reserved Traffic Rate*(Current Time−Last Grant Time)

In the UL, it could either be due to minimum rate requirements, in which case the same mechanism is used to determine the Grant Size. Alternatively, if it is scheduled due to polling interval requirements, then the 6 bytes is allocated for the reasons described in above for RT.

Best Effort (BE) Service & Others with 'No Reason'

The BE connections and the RT and NRT connections at the end of the queue will have been scheduled because there is data pending and any QoS requirements have already been met. The Burst Mapper will go through the remaining connections and where a grant (or polling allocation in UL case only) has not already been made, will attempt to make the largest grant allocation for that connection. Where a grant (or polling allocation in case of UL only) has already been made (as possible in the case of RT and NRT connections) the Burst Mapper will attempt to increase the size of their allocation to the largest possible. In the case of RT and NRT the largest possible grant will be determined by the Maximum Sustained Traffic Rate, such that:

Grant Size=Maximum Sustained Traffic Rate*(Current Time−Last Grant Time)

In the case of BE, where this parameter is not set, the Burst Mapper will use the maximum PDU size possible, taking into account the limits outlined above.

SUMMARY

The high-level architecture of the WiMAX Basestation Lower MAC Scheduler and PDU Builder subsystem has been described, with detailed description of the 'key' components, constituent functions and data structures, as well as the interaction between the 'key' components as well as other components that are not considered part of the scheduler or PDU builder.

The subsystem design will ensure the QoS requirements set for the active connections are met as well as maximising the system wide spectral efficiency through a combination of self-optimising fractional frequency reuse and proportional fair scheduling. In the above-described embodiment, this is achieved by ensuring that each station is correctly assigned into the most appropriate reuse zone, and then by allocating radio resource to connections to ensure minimum QoS is met first. Remaining radio resource is then allocated based on a proportional fair criterion. However, proportional fair is not the only possible algorithm for allocating the remaining resource. Another possible approach is to do this based only on CINR of each connection, with "fairness" being provided at the QoS level, e.g. when assigning a service class to the connection.

Whilst the subsystem can be viewed as somewhat complicated, this will be inherent in any solution that ensures minimum QoS requirements are met. However, the design of all of the constituent functions and algorithms is kept simple and well structured with the aim to limit the amount of processing power required to implement the subsystem.

The above description has referred by way of example to a SISO wireless communication system, i.e. a system in which a single antenna at the BS exchanges signals with a single antenna at the SS. However, a MIMO system could also employ the subsystem of the present invention; in a MIMO system, multiple antennas (and associated receiver circuitry) are present at each end of the connection.

Embodiments of the present invention may be implemented in hardware, or as software modules running on one or more processors, or on a combination thereof. That is, those skilled in the art will appreciate that a microprocessor or digital signal processor (DSP) may be used in practice to implement some or all of the functionality of the above-described subsystem. The invention may also be embodied as one or more device or apparatus programs (e.g. computer programs and computer program products) for carrying out part or all of any of the methods described herein. Such programs embodying the present invention may be stored on computer-readable media, or could, for example, be in the form of one or more signals. Such signals may be data signals downloadable from an Internet website, or provided on a carrier signal, or in any other form.

Industrial Applicability

Thus, the present invention relates to a wireless communication system in which base stations communicate with subscriber stations by exchange of data packets contained within frames. The frames, which occupy a certain time duration as well as frequency range, each include a downlink subframe from a base station to subscriber stations, and an uplink subframe used by the subscribers to send data to the base station. Each subframe includes a plurality of zones, and each base station maintains a plurality of simultaneous connections with the subscribers by transmitting packets within the zones to the relevant subscriber stations. The zones allow frequency reuse when subscribers are located in different cells served by the same base station. In addition, each connection has an associated service level requiring more or less resources within the system.

A base station embodying the invention comprises a subsystem providing packet scheduling and fractional frequency reuse management, having: means for receiving packets for transmission from the base station over each of the connections; means for packet scheduling within a current downlink subframe by firstly, determining time-critical connections that need to be scheduled within the subframe to achieve their service level, secondly, determining any non-time-critical connections which are able to be scheduled within the subframe using resources still available, then assigning a priority order of such other connections, and means for performing fractional frequency reuse of available frequencies available for transmissions from the base station by assigning a zone to each connection based on a comparison between a signal level from the subscriber station and a variable threshold.

The priority order given to non-time-critical connections during scheduling may be governed by parameters set by the system operator, whereas the service levels used to determine time-critical connections are set in the system standard. The threshold used for fractional frequency reuse is selected to provide an optimal Reuse3/Reuse1 transition for subscribers within a particular cell.

Although the above description has referred to an IEEE 802.16 wireless communication system by way of example, the invention may be applied to other communication systems in which packet scheduling is required in a MAC layer of a protocol stack.

The invention claimed is:

1. A module for use in a base station of a wireless communication system in which packets of data are at least transmitted at least on a downlink from the base station to a plurality of subscriber stations, the base station defining, connections with the subscriber stations, each connection having one of a plurality of service classes, each service class having an associated QoS, the module allocating system resources available within a predetermined unit of time to each connection and comprising:
    a first-stage scheduler responsive to the QoS requirements of the connections to determine connections that need to be scheduled within the predetermined unit of time to achieve their QoS;
    a second-stage scheduler arranged, once scheduling by the first-stage scheduler is complete, to determine any other connections which are able to be scheduled within the predetermined unit of time, using any resources still available after allocating resources to those connections that need to be scheduled, and to assign a priority order of such other connections based on requirements other than QoS to maximise spectral efficiency in the system; and a resource allocator for allocating resources to each connection at least on the downlink in accordance with the determinations made by the first-stage scheduler and second-stage scheduler.

2. A module as claimed in claim 1 wherein each of the first-stage scheduler and second-stage scheduler is arranged to output a list of connection descriptors.

3. A module as claimed in claim 2 wherein the list of connection descriptors output by the first-stage scheduler is arranged in a priority order based on service class.

4. A module as claimed in claim 2 wherein the list of connection descriptors output by the second-stage scheduler is ranked by order of preference for allocating resources.

5. A module as claimed in claim 2 further comprising a combiner for combining the lists of connection descriptors into a single list and for supplying the combined list to the resource allocator.

6. A module as claimed in claim 1 wherein:
 the predetermined unit of time is a frame, the frame includes a plurality of bursts and the resource allocator includes a burst mapper for assigning bursts to connections;
 the frame is divided into a downlink subframe and an uplink subframe, packets of data being transmitted from the base station to the subscriber stations during the downlink subframe;
 the module is arranged to receive packets in the form of service data units (SDUs) for transmission in the downlink subframe and further comprises a PDU builder for forming the SDUs into protocol data units (PDUs), the PDU builder being arranged for forming PDUs based on information from the burst mapper; and
 the module operable for arranging configured to arrange incoming SDUs into queues for forwarding to the PDU builder.

7. A subsystem for a base station comprising the module according to claim 1, the base station used in a wireless communication system in which frames of data are transmitted to a plurality of subscriber stations via the base station, the frames being divided timewise into a plurality of zones and each zone comprising a number of bursts, the base station receiving signals from and defining connections with subscriber stations within a plurality of adjacent regions and serving those connections by allocating resources within the frames, wherein the subsystem further comprises:
 zone assignment means for receiving a signal level for each connection and performing zone assignment of the connection based on a comparison of said signal level with a threshold level, and
 a fractional frequency reuse (FFR) manager for selecting the threshold level employed by the zone assignment means for zone assignment.

8. A subsystem according to claim 7, wherein the zone assignment means is part of a station manager for receiving and maintaining information on each of the connections including said signal level and assigning a burst profile to the connection within the assigned zone, the station manager being arranged to pass information on each of the connections to the first-stage scheduler and the second-stage scheduler.

9. A subsystem as claimed in claim 8 wherein the subsystem implements in the base station a lower MAC layer of a protocol stack employed in the wireless communication system.

10. A subsystem according to claim 8 and which constitutes an LMAC scheduler and PDU Builder of a base station used in an IEEE 802.16 wireless communication system.

11. A base station for use in a communications network and defining, with each of a plurality of subscriber stations, connections each having one of a plurality of service classes, each service class having an associated QoS, the scheduling apparatus allocating system resources available within a predetermined unit of time to each connection at least on a downlink from the base station to the subscriber stations, the base station comprising:
 first-stage scheduler responsive to the service classes of the connections to determine connections that need to be scheduled within the predetermined unit of time to achieve their QoS;
 second-stage scheduler arranged, once scheduling by the first-stage scheduler is complete, to determine any other connections which are able to be scheduled within the predetermined unit of time, using any resources still available after allocating resources to those connections that need to be scheduled, and to assign a priority order of such other connections based on requirements other than QoS to maximise spectral efficiency in the system; and
 resource allocator for allocating resources to each connection in accordance with the determinations made by the first-stage scheduler and second-stage scheduler.

12. A scheduling method for communications between nodes of a communications network, the method comprising:
 defining, between the nodes, connections each having one of a plurality of service classes, each service class having an associated QoS; and
 allocating system resources available within a predetermined unit of time to each connection by:
 determining, in a first scheduling step, connections that need to be scheduled within the predetermined unit of time to achieve their QoS using the service classes of the connections;
 once scheduling by the first-stage scheduler is complete, determining, in a second scheduling step any other connections which are able to be scheduled within the predetermined unit of time, using any resources still available after allocating resources to those connections that need to be scheduled, and to assign a priority order of such other connections based on requirements other than QoS to maximise spectral efficiency in the system; and
 allocating resources to each connection in accordance with the determinations made by the first and second scheduling steps.

13. A wireless communication system in which base stations communicate with subscriber stations by exchange of data packets contained within frames, the frames each including a downlink subframe from a base station to subscriber stations, each subframe including a plurality of zones for the purpose of allowing frequency reuse, and each base station maintaining a plurality of simultaneous connections with the subscriber stations, each connection having an associated service level requiring more or less resources within the system, wherein each base station comprises:
 a receptor of packets for transmission from the base station over each of the connections;
 a scheduler of a current downlink subframe operable firstly, to determine connections that need to be scheduled within the subframe to achieve their service level, secondly, once scheduling by the first-stage scheduler is complete, to determine any other connections which are able to be scheduled within the subframe using any resources still available, then to assign a priority order of the connections, and a fractional frequency reuse manager of available frequencies available for transmissions from the base station, operable to assign a zone to each connection based on a comparison between a signal level from the subscriber station and a variable threshold.

14. A base station including the module of claim 1.

15. A base station including the subsystem of claim 7.

16. A computer-readable medium on which is recorded software which, when executed on a processor of a base station, provides the module of claim 1.

17. A computer-readable medium on which is recorded software which, when executed on a processor of a base station, provides the subsystem of claim 7.

* * * * *